United States Patent
Liu

(10) Patent No.: US 9,967,476 B2
(45) Date of Patent: May 8, 2018

(54) PARALLEL VIDEO EFFECTS, MIX TREES, AND RELATED METHODS

(71) Applicant: ROSS VIDEO LIMITED, Iroquois (CA)

(72) Inventor: Yu Liu, Kanata (CA)

(73) Assignee: ROSS VIDEO LIMITED, Iroquois Ontario (CA)

( * ) Notice: Subject to any disclaimer, the term of this patent is extended or adjusted under 35 U.S.C. 154(b) by 373 days.

(21) Appl. No.: 14/516,596

(22) Filed: Oct. 17, 2014

(65) Prior Publication Data

US 2016/0112648 A1    Apr. 21, 2016

(51) Int. Cl.
*H04N 5/265* (2006.01)
*H04N 5/275* (2006.01)

(52) U.S. Cl.
CPC ............ *H04N 5/265* (2013.01); *H04N 5/275* (2013.01)

(58) Field of Classification Search
CPC ........ H04N 5/265; H04N 5/275; H04N 5/272; H04N 9/75; H04N 9/76; G09G 2340/10; G09G 5/026; G09G 5/377; G09G 5/397
See application file for complete search history.

(56) References Cited

U.S. PATENT DOCUMENTS

| 4,028,727 A * | 6/1977 | Skrydstrup ............ H04N 5/268 348/584 |
| 4,851,912 A | 7/1989 | Jackson |
| 4,947,254 A | 8/1990 | Abt et al. |
| 5,351,067 A * | 9/1994 | Lumelsky ................ G09G 5/14 345/519 |
| 5,687,181 A | 11/1997 | Suemura |
| 5,745,837 A | 4/1998 | Fuhrmann |
| 5,930,273 A | 7/1999 | Mukojima |
| 5,956,372 A | 9/1999 | Vaman |
| 6,300,985 B1 | 10/2001 | Lowe |

(Continued)

OTHER PUBLICATIONS

Electronics—Tutorials ("The Binary Adder", Electronics—Tutorials.ws, at http://www.electronics-tutorials.ws/combination/comb_7.html, published as of Nov. 14, 2012 and archived at http://web.archive.org/web/20121114210539/http://www.electronics-tutorials.ws/combination/comb_7.html).*

(Continued)

*Primary Examiner* — William Beutel
(74) *Attorney, Agent, or Firm* — Nixon Peabody LLP; Jeffrey L. Costellia

(57) ABSTRACT

Parallel video effects, mix trees, and related methods are disclosed. Video data inputs are mixed in parallel according to a mix parameter signal associated with one of the video data inputs. A resultant parallel mixed video data output is further mixed with a further video data input according to a composite mix parameter signal, which corresponds to a product of mix parameter signals that are based on mix parameter signals respectively associated with multiple video data inputs. The mix parameter signals could be alpha signals, in which case the composite mix parameter signal could correspond to a product of complementary alpha signals that are complements of the alpha signals. Composite mix parameter signals and mix results could be truncated based on a number of levels in a multi-level mix tree and an error or error tolerance. Rounding could be applied to a final mix output or an intermediate mix result.

20 Claims, 20 Drawing Sheets

(56) References Cited

U.S. PATENT DOCUMENTS

| | | |
|---|---|---|
| 6,356,555 B1 | 3/2002 | Rakib |
| 6,798,756 B1 | 9/2004 | Kosugi |
| 7,788,568 B1 | 8/2010 | Huang |
| 8,750,423 B2 | 6/2014 | Hamada |
| 2004/0005099 A1* | 1/2004 | Gu .................. G06T 15/503 382/284 |
| 2004/0189676 A1* | 9/2004 | Dischert .............. G06T 5/20 345/639 |
| 2007/0106719 A1 | 5/2007 | Bailey |
| 2009/0213265 A1 | 8/2009 | Yamashita |
| 2009/0290634 A1 | 11/2009 | Yamashita |
| 2009/0303385 A1 | 12/2009 | Yamashita |
| 2010/0091989 A1 | 4/2010 | Yamashita |
| 2010/0287434 A1 | 11/2010 | Fukuda |
| 2013/0179757 A1 | 7/2013 | Kamiya |
| 2013/0258051 A1 | 10/2013 | Gillard |
| 2015/0101002 A1 | 4/2015 | Yamashita |
| 2015/0220383 A1 | 8/2015 | Saito |
| 2015/0326348 A1 | 11/2015 | Shen |
| 2016/0345022 A1 | 11/2016 | Ju |
| 2017/0111639 A1 | 4/2017 | Jung |

OTHER PUBLICATIONS

Arithmetic Circuits ("5.5 Combinational Multiplier", at http://www2.elo.utfsm.cl/~lsb/elo211/aplicaciones/katz/chapter5/chapter05.doc5.html, originally published Jul. 14, 1996, and archived as of Jul. 6, 2012 at http://web.archive.org/web/20120706024211/http://www2.elo.utfsm.cl/~lsb/elo211/aplicaciones/katz/chapter5/chapter05.doc5.ht.*

D. Bryan, "Mixers (Switchers) and Special Effects Generators", TV & Video Engineer's Reference Book, pp. 35/1-35/12, first published 1991, ISBN 0-7506-1021-2.

Office Action issued in U.S. Appl. No. 14/516,599 dated Jul. 10, 2017 (14 pages).

SMPTE ST 352:2010, "Video Payload Identification Codes for Serial Digital Interfaces", Feb. 23, 2010, pp. 1-30.

SMPTE 291M-2006, "For Television—Ancillary Data Packet and Space Formatting", Sep. 20, 2006, pp. 1-14.

SMPTE 259M-2008, "For Television—SDTV1 Digital Signal/Data—Serial Digital Interface", Jan. 29, 2008, pp. 1-18.

SMPTE 274M-2008, "For Television—1920×1080 Image Sample Structure, Digital Representation and Digital Timing Reference Sequences for Multiple Picture Rates", Jan. 29, 2008, pp. 1-35.

SMPTE 424M-2006, "For Television—3 Gb/s Signal/Data Serial Interface", Apr. 5, 2006, pp. 1-9.

RP 168-2009, "Definition of Vertical Interval Switching Point for Synchronous Video Switching", Jul. 17, 2009, pp. 1-23.

SMPTE ST 292-1:2012, "1.5 Gb/s Signal/Data Serial Interface", Jan. 3, 2012, pp. 1-21.

Recomendacion ITU-R BT.656-5, "Interface for digital component video signals in 525-line and 625-line television systems operating at the 4:2:2 level of Recommendation ITU-R BT.601", (1986-1992-1994-1995-1998-2007), pp. 1-13.

* cited by examiner

PARALLEL VIDEO EFFECTS, MIX TREES, AND RELATED METHODS

CROSS-REFERENCE TO RELATED APPLICATION

The present application is related to U.S. patent application Ser. No. 14/516,599, entitled "TRANSFER OF VIDEO AND RELATED DATA OVER SERIAL DATA INTERFACE (SDI) LINKS", filed concurrently herewith and incorporated herein by reference.

FIELD OF THE INVENTION

This invention relates generally to video processing and, in particular, to parallel video effects and mix trees.

BACKGROUND

Video production switchers provide a function which layers multiple video sources. Each video source is associated with an alpha source which defines transparent areas of the video source on the top over lower layers. The base layer or the base source is called the background. Traditionally, the background is not associated with any alpha. It can be thought of as a fully visible layer which blocks any scenes behind it.

Conventional cascaded or sequential processing of video effects such as layering can entail significant delay.

SUMMARY

According to an aspect of the present disclosure, an apparatus includes video data mixing modules to mix video data inputs. The video data mixing modules include a video data mixing module to mix video data inputs in parallel according to a mix parameter signal associated with one of the video data inputs and to provide a parallel mixed video data output, and a video data mixing module to further mix the parallel mixed video data output with a further video data input according to a composite mix parameter signal. The composite mix parameter signal corresponds to a product of mix parameter signals that are based on mix parameter signals respectively associated with multiple video data inputs.

The apparatus could also include a composite mix parameter signal computation module to compute the composite mix parameter signal. The composite mix parameter signal computation module is coupled to the video data mixing module that is to further mix the parallel mixed video data output with a further video data input.

The video data mixing modules could include video data mixing modules to mix respective pairs of video data inputs in parallel and to provide respective parallel mixed video data outputs, and video data mixing modules for each of multiple video effects levels, to further mix video data inputs in accordance with respective composite mix parameter signals. The video data mixing modules at levels above a first level of the video effects levels are coupled to receive and further mix respective pairs of the parallel mixed video data outputs.

The mix parameter signals respectively associated with multiple video data inputs could be alpha signals, in which case the composite mix parameter signal could correspond to a product of complementary alpha signals that are complements of the alpha signals.

In an embodiment, the video data mixing modules include a respective video data mixing module for each node in a binary tree, to mix two video data input signals that include respective video data output signals from two child nodes in the binary tree. Each respective video data mixing module could then calculate a video data output signal for its node in the binary tree by adding the video data output signal from one of the two child nodes in the binary tree to a weighted video data output signal from the other one of the two child nodes. The weighted video data output signal could be weighted by a complement of an alpha signal associated with the one of the two child nodes.

The video data mixing modules could include video data mixing modules to mix video data inputs at respective nodes in the binary tree according to respective composite mix parameter signals. The respective composite mix parameter signal for each video data mixing module for a node in the binary tree could correspond to a product of a complementary alpha signal from one of the two child nodes of the node and a complementary alpha signal from the other one of the two child nodes.

As noted above, the mix parameter signals respectively associated with multiple video data inputs could be alpha signals. The apparatus could also include pre-shaper devices coupled to the video data mixing modules, to receive respective video source signals and associated alpha signals, and to provide products of the respective video source signals and associated alpha signals as video data input signals.

Each of the video data mixing modules could include an A/B mix effect device.

Some embodiments include a composite mix parameter signal computation module to compute the composite mix parameter signal. The composite mix parameter signal computation module is coupled to the video data mixing module that is to further mix the parallel mixed video data output with a further video data input. In embodiments in which the mix parameter signals respectively associated with multiple video data inputs are alpha signals, the composite mix parameter signal computation module could include multiple adders to compute the complements of the alpha signals. The composite mix parameter signal computation module could also or instead include multipliers to compute products of the complementary alpha signals.

The composite mix parameter signal could correspond to a product of two of the complementary alpha signals that are respective complements of two of the alpha signals. In this case, the composite mix parameter signal computation module could include a first adder to compute a sum of the two of the alpha signals, a multiplier to compute a product of the two alpha signals, and a second adder to compute the composite mix parameter signal by subtracting the product from the sum.

In some embodiments, the apparatus also includes a first truncation module and a second truncation module. The first truncation module is coupled to the video data mixing module that is to further mix the parallel mixed video data output with a further video data input, to truncate the composite mix parameter signal based on an error and to provide a truncated composite mix parameter signal to the video data mixing module that is to further mix the parallel mixed video data output with a further video data input. The second truncation module is coupled to the video data mixing module that is to further mix the parallel mixed video data output with a further video data input, to truncate, based on the error, a further video data output signal from the video data mixing module that is to further mix the parallel mixed video data output with a further video data input.

A method of mixing video data inputs is also provided, and involves mixing video data inputs in parallel according to mix parameter signals associated with one of the video data inputs, to provide a parallel mixed video data output, and further mixing the parallel mixed video data output with a further video data input according to a composite mix parameter signal. The composite mix parameter signal corresponds to a product of mix parameter signals that are based on mix parameter signals respectively associated with multiple video data inputs.

The mixing could involve mixing respective pairs of video data inputs in parallel, to provide respective parallel mixed video data outputs, and the further mixing could then involve further mixing respective pairs of the parallel mixed video data outputs modules in accordance with respective composite mix parameter signals.

As noted above, the mix parameter signals respectively associated with multiple video data inputs could be alpha signals, and the composite mix parameter signal could correspond to a product of complementary alpha signals that are complements of the alpha signals.

The mixing and the further mixing could involve respective mix operations for each node in a binary tree, to mix two video data input signals that comprise respective video data output signals from two child nodes in the binary tree. Each respective mix operation could involve calculating a video data output signal for its node in the binary tree by adding the video data output signal from one of the two child nodes in the binary tree to a weighted video data output signal from the other one of the two child nodes.

A method could also involve truncating the composite mix parameter signal based on an error to generate a truncated composite mix parameter signal, in which case the further mixing could involve further mixing the parallel mixed video data output with the further video data input according to the truncated composite mix parameter signal. In some embodiments, the method further includes truncating, based on the error, a further video data output signal from the further mixing.

An apparatus according to another aspect includes video data mixing modules to mix video data inputs in parallel at one or more levels of a multi-level mix tree. The video data mixing modules include one or more video data mixing modules at each of the one or more levels to further mix parallel mixed video data outputs at the one or more levels with other video data inputs according to a respective composite mix parameter signal for each of the one or more video data mixing modules. A respective first truncation module is coupled to each of the one or more video data mixing modules, to truncate the respective composite mix parameter signal for each of the one or more video data mixing modules based on a number of levels in the multi-level mix tree and an error tolerance and to provide a respective truncated composite mix parameter signal to each of the one or more video data mixing modules. A respective second truncation module is coupled to each of the one or more video data mixing modules, to truncate respective video data output signals from each of the one or more video data mixing modules.

The respective second truncation module could include a truncation module to truncate a video data output signal from one of the one or more video data mixing modules to a fractional precision based on the number of levels in the multi-level mix tree and the error tolerance.

The respective second truncation module could also include a rounding module to round a video data output signal, from a top level video data mixing module at a top level of the mix tree, to an integer value.

In some embodiments, a rounding module is coupled to a top level video data mixing module at a top level of the mix tree, to round a video data output signal from the top level video data mixing module to an integer value.

A method in accordance with yet another aspect involves mixing video data inputs in parallel at one or more levels of a multi-level mix tree, with the mixing involving further mixing parallel mixed video data outputs at the one or more levels with other video data inputs according to one or more respective composite mix parameter signals; truncating the one or more respective composite mix parameter signals based on a number of levels in the multi-level mix tree and an error tolerance to generate one or more respective truncated composite mix parameter signals for the further mixing, with the further mixing involving further mixing the parallel mixed video data outputs at the one or more levels with the other video data inputs according to the one or more respective truncated composite mix parameter signals; and truncating one or more respective video data output signals from the further mixing to a fractional precision based on the number of levels in the multi-level mix tree and the error tolerance.

The multi-level mix tree could include L levels, where $2^{L-1} < N \leq 2^L$ and N is a number of source signals to be mixed in the mix tree, and the error tolerance could be $2^{-M}$ bits error. In this case, the fractional precision could be a lesser of L+M bits and a maximum number of bits.

With M=2, the method could include rounding a mix output from a top level of the mix tree to an integer value, or rounding a mix output from the further mixing to an integer value.

Other aspects and features of embodiments of the present disclosure may become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Video Layering

Figure 1:
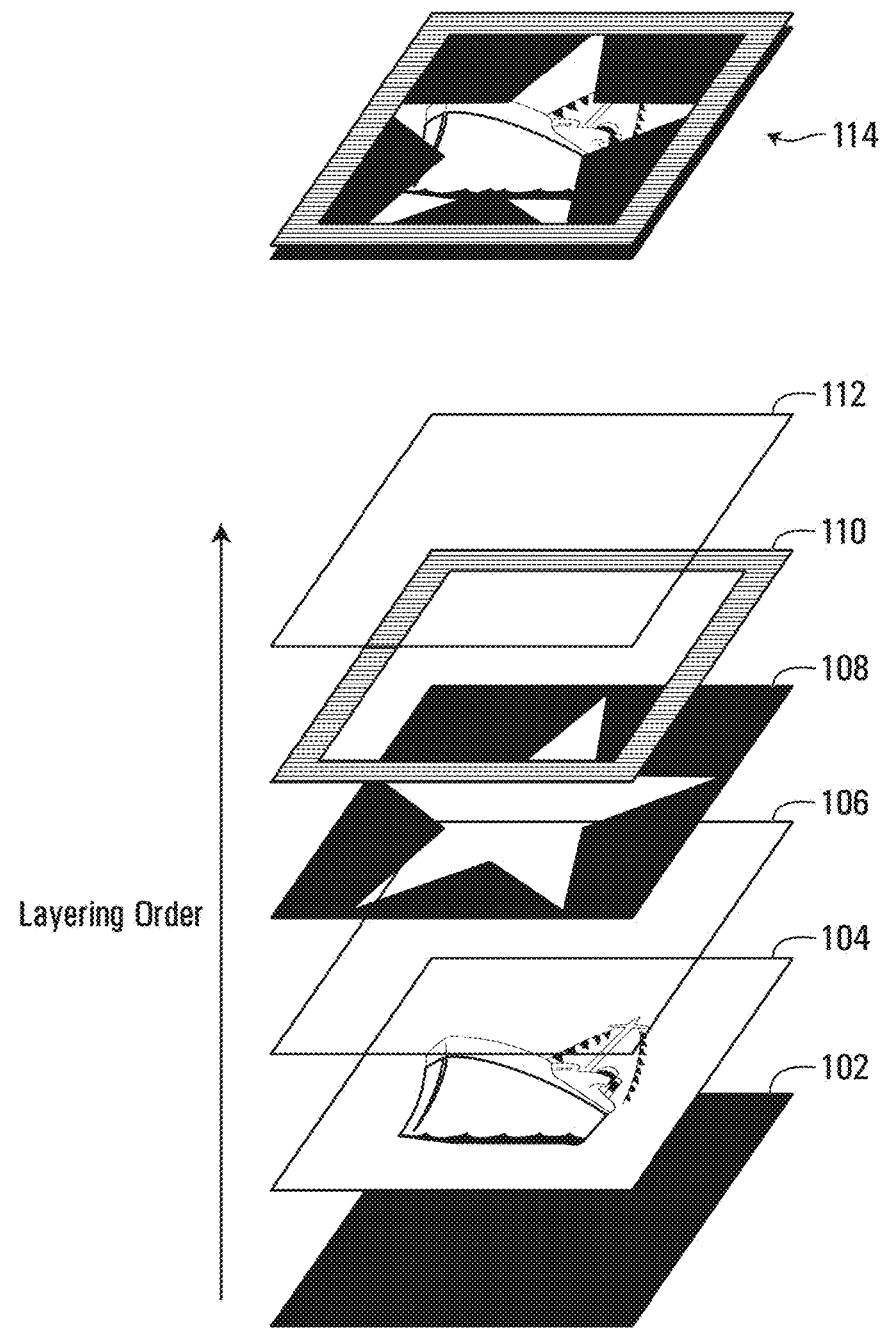
FIG. 1 illustrates an example of layering of multiple video sources.

FIG. 1 illustrates an example of layering of multiple video sources. On the bottom of the drawing above the drop shadow background 102, the base video source 104 is a ship against a backdrop. On the top over the base video source 104, a pre-lighting layer 106 sheds a light on the center of the base video source. A pattern mask 108 crops the shining ship by a star shape. A border 110 is superimposed on the pre-lit and star-cropped base video source 104. Finally, post-lighting 112 is applied to the combination of lower layers, to re-shine the ship again, with a different color light for example. The resultant layered video is shown at 114.

Such video layering is illustrative of a type of video processing to which embodiments of the present disclosure could be applied.

A/B Mix Effect

Figure 2:
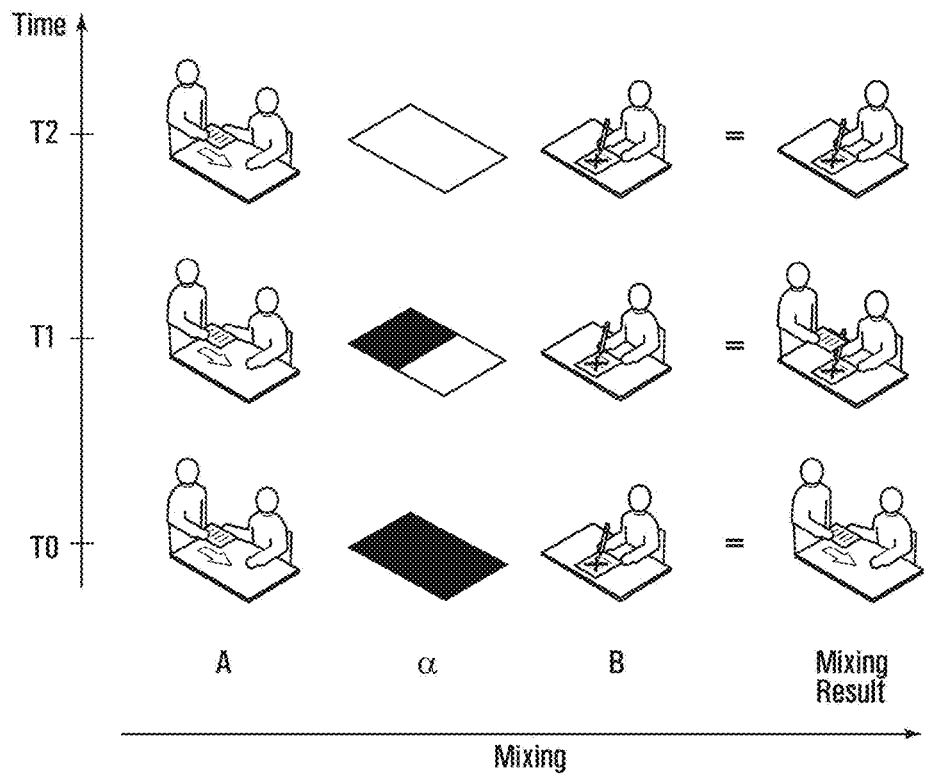
FIG. 2 illustrates A/B mixing.

One possible way to implement video layering such as shown in FIG. 1 is to layer each video source on the top over preceding layers by applying a so-called A/B mix effect or operation. FIG. 2 illustrates A/B mixing, or a process of A/B mix effect, where a preceding layer video source A is gradually overlapped by an upper layer video source B. At time T0, an alpha channel associated with video source B defines all areas of layer B as see-through to the bottom layer A. At time T1, the associated alpha channel defines a part of layer B as opaque to the lower layer A, and video source B takes over the opaque area. At time T2, the associated alpha channel defines the entire area of layer B as opaque to video source A, and hence video source B covers the entire lower layer video source A.

The A/B mix effect is expressed in such a formula as:

$$O_{mix} = (1-\alpha)A + \alpha B, \qquad \text{Eq. 1-1}$$

where $\alpha \in [0,1]$

The A/B mix effect has following properties.
1. Only two video sources A and B are involved. The layering process does not involve other video sources.
2. There is seamless transition between two equal sources, when A=B. In this case $O_{mix}=(1-\alpha)A+\alpha B=(1-\alpha)A+\alpha A=A$ and no transition error occurs, under a condition that any arithmetic operation maintains sufficient precision.
3. There is also no error propagation because any limited precision of the alpha channel does not carry on into following layering processes. In other words, the associated alpha channel is only used in a single mix effect related only to a current upper layer.
4. An alpha channel associated with video source B could be an attribute extracted from layer B such as a chroma key and/or luma key. It could instead be designed specifically for layer B use but not be extracted from layer B, such as an auto-key. It could also or instead include a completely independent control signal created and modified externally regardless of layer B, such as a preset pattern key. Thus, an alpha channel is associated with a video source, but need not necessarily be extracted from a video source or layer.

Another style of expression of the A/B mix effect is as follows:

$$O_{mix} = A\alpha' + \hat{B}, \qquad \text{Eq. 1-2}$$

where $\alpha'=(1-\alpha)$ and $\hat{B}=\alpha B$

Eq. 1-2 is called the shaped style of A/B mix effect because the new upper layer video source B is pre-multiplied or pre-shaped by its associated alpha channel ahead of the mix operation, while the bottom layer video source A is multiplied or weighted by layer B's complementary alpha, $\alpha'$. This shaped style of A/B mix effect is useful for further layering-related mathematic derivations set out herein.

Cascade Mix Tree

When multiple video sources are layered through cascaded A/B mix effects, the resultant output can be expressed in a formula:

$$o_{mix} = (...((B\alpha'_1 + F_1\alpha_1)\alpha'_2 + F_2\alpha_2)\alpha'_3 + ...)\alpha'_n + F_n\alpha_n \qquad \text{Eq. 1-3}$$
$$= (...((B\alpha'_1 + \hat{F}_1)\alpha'_2 + \hat{F}_2)\alpha'_3 + ... + \hat{F}_{n-1})\alpha'_n + \hat{F}_n$$

where
$O_{mix}$ is output of cascaded A/B mix processes,
B is a base layer or background,
$F_i$ is a foreground video source at layer i
$\hat{F}_i$ is a preshaped foreground video at layer i
$\alpha_i$ is the mixing alpha at layer i, associated with $F_i$
$\alpha'_i$ is a complementary alpha equal to $(1-\alpha_i)$.

In Eq. 1-3, all layers except the base layer or background are referred to as foreground.

Figure 3:
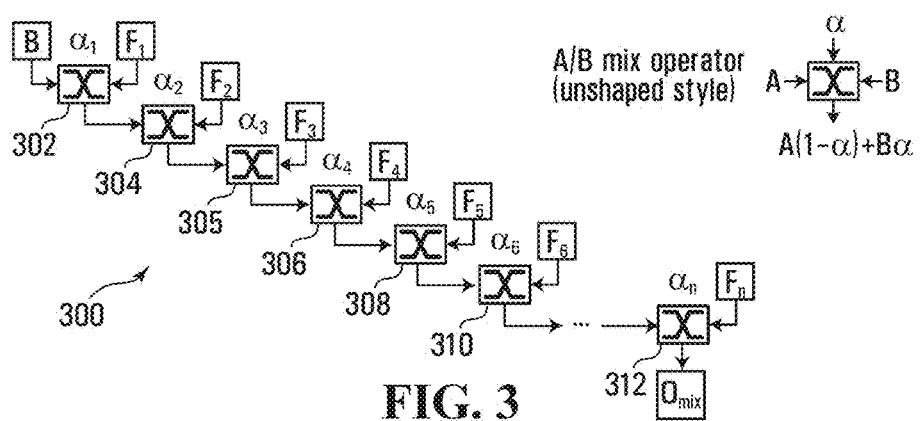
FIG. 3 is a block diagram of a binary tree depicting a cascaded chain of multiple A/B mix processes.

A graph or binary tree is used to describe Eq. 1-3, as illustrated in FIG. 3. FIG. 3 is a block diagram of a binary tree depicting a cascaded chain of multiple A/B mix processes. Such a binary tree is called a mix tree in the video production switcher industry.

As shown, the example binary tree 300 includes a background video source B, and n foreground video sources $F_1$ through $F_n$ each having an associated alpha channel. The A/B mix operators 302, 304, 305, 306, 308, 310, 312, and any further mix operators between 310 and 312, perform A/B mixing on their video input data. The A/B mix operator 302 receives two video sources B and $F_1$, and each subsequent A/B mix operator in the example binary tree receives as its video input data one video source $F_i$ and one output from a lower layer A/B mix operator. The output $O_{mix}$ is the final output from the last A/B mix operator 312 in the example binary tree 300.

Background, Key, and Multiple Level Effect (MLE)

In a production switcher, the video layering process may group multiple video sources into different levels which include
1) Background (BKGD), at the lowest level such as preset bus or program bus, and solid black in color;
2) Keys at upper level groups, from respective single video sources and/or related multiple effects or multi-layer artifacts such as drop shadow, border, lighting, and matte fills;
3) MLE (Multiple Level Effect) at a top level, grouped from a background and multiple keys.

The following notes elaborate on each group in more detail.

Background could be constructed by mixing or blending a video from a preset bus into a video from a program bus. If the video on the program bus is black, then the mixing process is called "fade to black". Control signals for such a background mix operation are generally provided by a specific pattern generator inside a video production switcher regardless of associated alpha channels from either the preset bus or the program bus. In other words, the control signals might have nothing to do with any attribute from the source videos. However, some production switchers introduce associated alpha channels for background mixing, such as Digital Video Effect (DVE) wipe.

A key is an independent video layer with multiple effects on the top over a background or other keys. These effects could include, for example, any one or more of drop shadow, border frame, crop/mask, lighting, resizing, and possibly others. More effects are still under consideration and development in the industry. Keying is a process which forms a key before it is applied, and then adds the key on the top of background or the other keys. For example, keying could include modifying a video source for any one or more of color correction, matte fill, and lighting, and/or modifying the associated alpha channel for any one or more of effects such as mask, gain, and clip.

A traditional definition for a key is different from that in the preceding paragraph. A traditional key is a signal constructed from attributes of a source video or an external signal. A key signal is equivalent to an alpha channel associated with video B in A/B mix effect. Key fill is a term referred to as video B but may be a matte color instead of the original video source. With techniques advancing and more complicated effects being involved, the concept of key evolves into an independent video layer itself as defined in the preceding paragraph, rather than just a control signal from attributes of source videos.

MLE is an independent composite layer constructed from a background and one or more keys. Generally, one MLE re-enters to video source buses such as program/preset bus or key buses as a single video source but without an alpha channel or with a virtual alpha channel of full transparency to the video.

The latest designs for layering processes may provide more effects such as background formed with associated alpha channels such as "DVE wipe" or MLE re-entry with a composite of all associated alphas such as "layer-mode MLE", and so on.

Although a key layer is independent, it could be formed by multiple layers except that each layer inside a multi-layer key is ordered in a fixed or pre-defined priority. Normally, these inside layers are not allowed to switch order. On the other hand, an MLE could allow multiple keys to switch layer priorities, and multiple MLEs could also or instead switch overall MLE priorities relative to each other.

Figure 4:
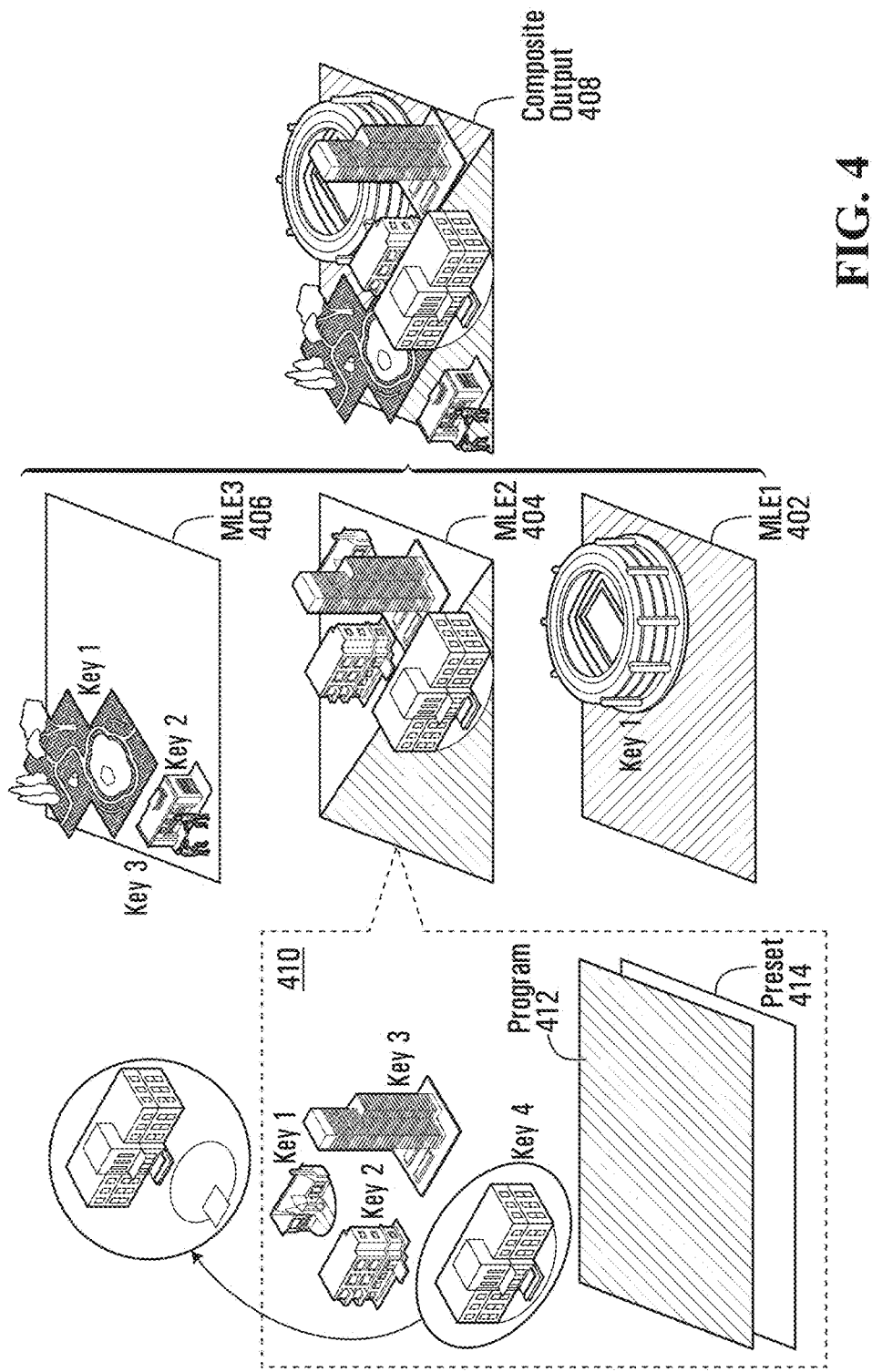
FIG. 4 illustrates different groups of layers and composite video output.

FIG. 4 illustrates different groups of layers and a composite video output. FIG. 4 shows the structure of three example MLEs 402, 404, 406. MLE1 402 has a background and Key 1. As shown at 410, MLE2 404 has a solid colored program 412, a transparent preset 414, and four keys including Key 1, Key 2, Key 3, and Key 4. Key 4 of MLE2 404 includes a ground component and a building component. MLE3 406 is formed by three keys, including Key 1, Key 2, Key 3, and a transparent background. The composite output 408 comes from layering all three MLEs.

Issues on Cascade Mix Trees

A binary tree of cascaded mix processes, expressed in Eq. 1-3 and illustrated in FIG. 3, has an issue of a long electronic delay. In order to appreciate the amount of delay and its impact on video production switcher performance, consider an example of advanced video production switchers which can provide
  4 to 8 MLEs per switcher,
  4 to 8 keys per MLE, and
  4 to 8 effect layers per key.

The minimum number of layers in this example is $4 \times 4 \times 4 = 2^6$, and the maximum layers is $8 \times 8 \times 8 = 2^9$. In the future, the number of keys and the number of MLEs could be even higher. If each layer mix requires 4 or 5 pixel samples to implement Eq. 1-1, then the maximum number of calculation cycles could be beyond $2^{11} = 2048$, which is close to a High Definition (HD) horizontal resolution of 2200 pixels. However, according to SMPTE RP168-2009 from the Society of Motion Picture & Television Engineers (SMPTE), a switch position shall keep a variation within a half of an HD line. A cascade tree may produce a process delay beyond this requirement from SMPTE RP168-2009.

Parallel Mix Trees

A parallel structure for a mix tree as disclosed herein could not only reduce the number of stages and the corresponding delays, but could also take advantage of advanced parallel computing techniques. For instance, if a full parallel structure is used, processing stages could be reduced from $2^9 = 512$ for a cascade mix tree to just 9 for a parallel structure as described below.

Although parallel structures are useful for implementing mix trees, a parallel structure could introduce concerns regarding calculation precision and data accuracy, as discussed below. Fortunately, advanced processing techniques provide computing devices with floating-point arithmetic units or wider-bit fixed-point arithmetic units sufficient to alleviate such concerns.

Full Parallel Structure

With reference to Eq. 1-3, in order to simplify derivations the following are defined:
1) the top layer is layer $n = 2^L - 1$ where L is the number of levels in the parallel binary tree,
2) including the background, the total number of video sources is $2^L$, and 3) the cascade tree splits into two segments, including a first segment starting at the background and ending at layer $(2^{L-1}-1)$, and a second segment starting at layer $2^{L-1}$ and ending at layer $(2^L-1)$.

Then, Eq. 1-3 can be re-written as:

$$O_{mix}=(\ldots(((\ldots((B\alpha'_1+\hat{F}_1)\alpha'_2+\hat{F}_2)\ldots)\alpha'_{2^{L-1}-1}+\hat{F}_{2^{L-1}-1})\alpha'_{2^{L-1}}+\hat{F}_{2^{L-1}})\ldots+\hat{F}_{2^L-2})\alpha'_{2^L-1}+\hat{F}_{2^L-1} \quad \text{Eq. 2-1}$$

where $\hat{F}_i=F_i\alpha_i$, $i \in [1, 2^L-1]$.

$\hat{F}_i$ is the shaped style of A/B mix defined in Eq. 1-2.

Defining the first segment of the mix tree in Eq. 2-1 as a background $O_{L-1,1}$ at the second level (L-1):

$$O_{L-1,1}=(\ldots((B\alpha'_1+\hat{F}_1)\alpha'_2+\hat{F}_2)\alpha'_3+\ldots)\alpha'_{2^{L-1}-1}+\hat{F}_{2^{L-1}-1} \quad \text{Eq. 2-2}$$

The subscript notation i,j means node j at level i. Using this notation, Eq. 2-1 becomes:

$$o_{mix}=(\ldots((o_{L-1,1}\alpha'_{2^{L-1}}+\hat{F}_{2^{L-1}})\alpha'_{2^{L-1}+1}+\hat{F}_{2^{L-1}+1}) \quad \text{Eq. 2-3}$$
$$\alpha'_{2^{L-1}+2}\ldots+\hat{F}_{2^L-2})\alpha'_{2^L-1}+\hat{F}_{2^L-1}$$
$$=o_{L-1,1}\alpha'_{2^{L-1}}\ldots\alpha'_{2\cdot 2^{L-1}-1}+$$
$$(\ldots(\hat{F}_{2^{L-1}}\alpha'_{2^{L-1}+1}+\hat{F}_{2^{L-1}+1})\alpha'_{2^{L-1}+2}\ldots+\hat{F}_{2\cdot 2^{L-1}-2})$$
$$\alpha'_{2\cdot 2^{L-1}-1}+F_{2\cdot 2^{L-1}-1}$$

Define the second segment of the mix tree in Eq. 2-1 as a foreground $O_{L-1,2}$ relative to the background $O_{L-1,1}$:

$$O_{L-1,2}=(\ldots((\hat{F}_{2^{L-1}}\alpha'_{2^{L-1}+1}+\hat{F}_{2^{L-1}+1})\alpha'_{2^{L-1}+2}+\hat{F}_{2^{L-1}+2})\alpha'_{2^{L-1}+3}+\ldots)\alpha'_{2\cdot 2^{L-1}-1}+\hat{F}_{2\cdot 2^{L-1}-1} \quad \text{Eq. 2-4}$$

Then, Eq. 2-3 as well as Eq. 2-1 simplify to:

$$o_{mix}=o_{L-1,1}\alpha'_{L-1,2}+o_{L-1,2} \text{ where} \quad \text{Eq. 2-5}$$

$$\alpha'_{L-1,2}=\prod_{i=1\cdot 2^{L-1}}^{2\cdot 2^{L-1}-1}\alpha'_i$$

Further splits in level (L-1) produce the level (L-2) of A/B mixes. For instance, $O_{L-1,1}$ splits into $O_{L-2,1}$ and $O_{L-2,2}$ such that:

$$o_{L-1,1}=(((\ldots((B\alpha'_1+\hat{F}_1)\alpha'_2+\hat{F}_2)\alpha'_3+\ldots)\alpha'_{2^{L-2}-1}+ \quad \text{Eq. 2-6}$$
$$\hat{F}_{2^{L-2}-1})\alpha'_{2^{L-2}}+\hat{F}_{2^{L-2}})\ldots+\hat{F}_{2\cdot 2^{L-2}-1}$$
$$=o_{L-2,1}\alpha'_{L-2,2}+o_{L-2,2}$$

where $$\alpha'_{L-2,2}=\alpha'_{2^{L-2}}\alpha'_{2^{L-2}+1}\ldots\alpha'_{2^{L-1}-2}\alpha'_{2^{L-1}-1}=\prod_{i=2^{L-2}}^{2\cdot 2^{L-2}-1}\alpha'_i$$

$$o_{L-2,1}=(\ldots((B\alpha'_1+\hat{F}_1)\alpha'_2+\hat{F}_2)\alpha'_3+\ldots)\alpha'_{1\cdot 2^{L-2}-1}+\hat{F}_{1\cdot 2^{L-2}-1}$$

$$o_{L-2,2}=$$
$$((\hat{F}_{2^{L-2}}\alpha'_{2^{L-2}+1}+\hat{F}_{2^{L-2}+1})\alpha'_{2^{L-2}+2}\ldots)\alpha'_{2\cdot 2^{L-2}-1}+\hat{F}_{2\cdot 2^{L-2}-1}$$

Similarly, $O_{L-1,2}$ splits into $O_{L-2,3}$ and $O_{L-2,4}$ such that:

$$o_{L-1,2}=(\ldots(((\ldots(\hat{F}_{2\cdot 2^{L-2}}\alpha'_{2\cdot 2^{L-2}+1}+\hat{F}_{2\cdot 2^{L-2}+1})\ldots) \quad \text{Eq. 2-7}$$
$$\alpha'_{3\cdot 2^{L-2}-1}+\hat{F}_{3\cdot 2^{L-2}-1})\alpha'_{3\cdot 2^{L-2}}+\hat{F}_{3\cdot 2^{L-2}})\alpha'_{3\cdot 2^{L-2}+1}\ldots)$$
$$\alpha'_{2^L-1}+\hat{F}_{2^L-1}$$
$$=o_{L-2,3}\alpha'_{L-2,4}+o_{L-2,4}$$

where $$\alpha'_{L-2,4}=\alpha'_{3\cdot 2^{L-2}}\alpha'_{3\cdot 2^{L-2}+1}\ldots\alpha'_{4\cdot 2^{L-2}-2}\alpha'_{4\cdot 2^{L-2}-1}=\prod_{i=3\cdot 2^{L-2}}^{4\cdot 2^{L-2}-1}\alpha'_i$$

$$o_{L-2,3}=$$
$$(\ldots(\hat{F}_{2\cdot 2^{L-2}}\alpha'_{2\cdot 2^{L-2}+1}+\hat{F}_{2\cdot 2^{L-2}+1})\ldots)\alpha'_{3\cdot 2^{L-2}-1}+\hat{F}_{3\cdot 2^{L-2}-1}$$

$$o_{L-2,4}=(\ldots(\hat{F}_{3\cdot 2^{L-2}}\alpha'_{3\cdot 2^{L-2}+1}+\hat{F}_{3\cdot 2^{L-2}+1})\alpha'_{3\cdot 2^{L-2}+2}\ldots)\alpha'_{4\cdot 2^{L-2}-1}+$$
$$\hat{F}_{4\cdot 2^{L-2}-1}$$

If such split actions are repeated until reaching to all sources from B to $F_n$, then a parallel binary tree is completed. This binary tree has $2^{L-1}$ nodes at level 1. Data at each node is formed using data from two lower-level children nodes. For instance, video data output from a node at level (l+1) is expressed such that $$O_{l+1,i}=O_{l,2i-1}\times\alpha'_{l,2i}+O_{l,2i}, \quad \text{Eq. 2-8}$$

where $i=1, 2, \ldots, 2^{L-l-1}$, $l=0, 1, \ldots, L$

Figure 5:
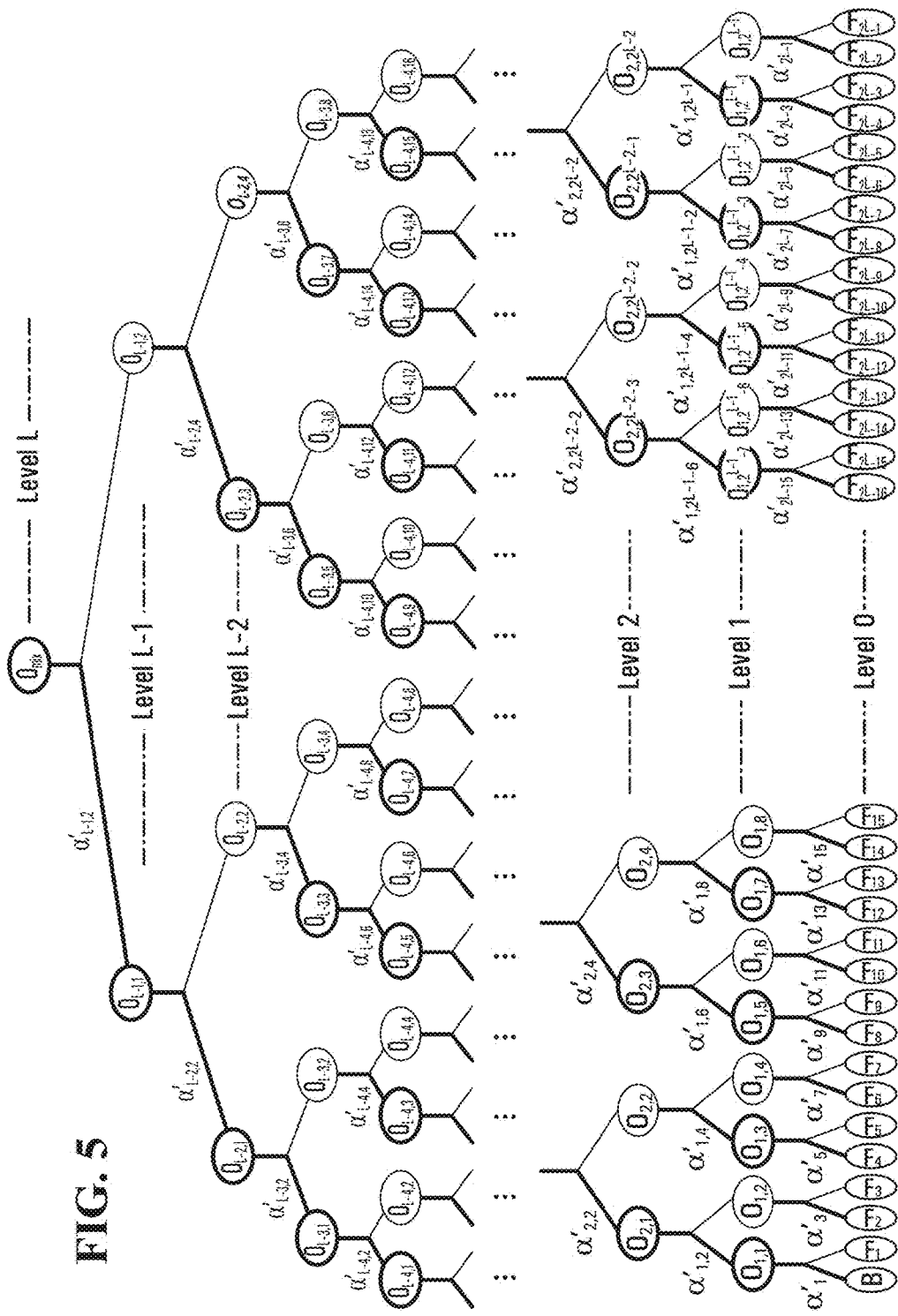
FIG. 5 illustrates an example parallel structure for a binary mix tree.

For convenience, $O_{l,2i-1}$ is referred to as video output from an odd child node and $O_{l,2i}$ is referred to as video output from an even child node in terms of video data $O_{l+1,i}$ from a node i at level (l+1). FIG. 5 illustrates an example parallel structure for a binary mix tree, and shows how a binary tree spans from top level to bottom level for parallel calculation.

Composite Alphas

Eq. 2-8 includes a composite of complementary alphas at level l which can be expressed in alphas at lower level (l-1) such that:

$$\alpha'_{l,2i}=\prod_{(2i-1)2^l}^{2i\cdot 2^l-1}\alpha'_k \quad \text{Eq. 2-9}$$

$$=\prod_{(4i-2)2^{l-1}}^{4i\cdot 2^{l-1}-1}\alpha'_k$$

$$=\left(\prod_{(4i-2)2^{l-1}}^{(4i-1)\cdot 2^{l-1}-1}\alpha'_k\right)\times\left(\prod_{(4i-1)2^{l-1}}^{4i\cdot 2^{l-1}-1}\alpha'_k\right)$$

$$=\alpha'_{l-1,4i-1}\times\alpha'_{l-1,4i}$$

where $i=1, 2, \ldots, 2^{L-l-1}$, $l=0, 1, \ldots, L$

Eq. 2-9 illustrates that:
1) a composite alpha for A/B mix effect involves alphas from even child nodes;
2) the even node alpha for A/B mix is formed from two lower-level composite alphas, including one from an odd child node (4i-1) and the other from an even child node 4i.

Figure 6:
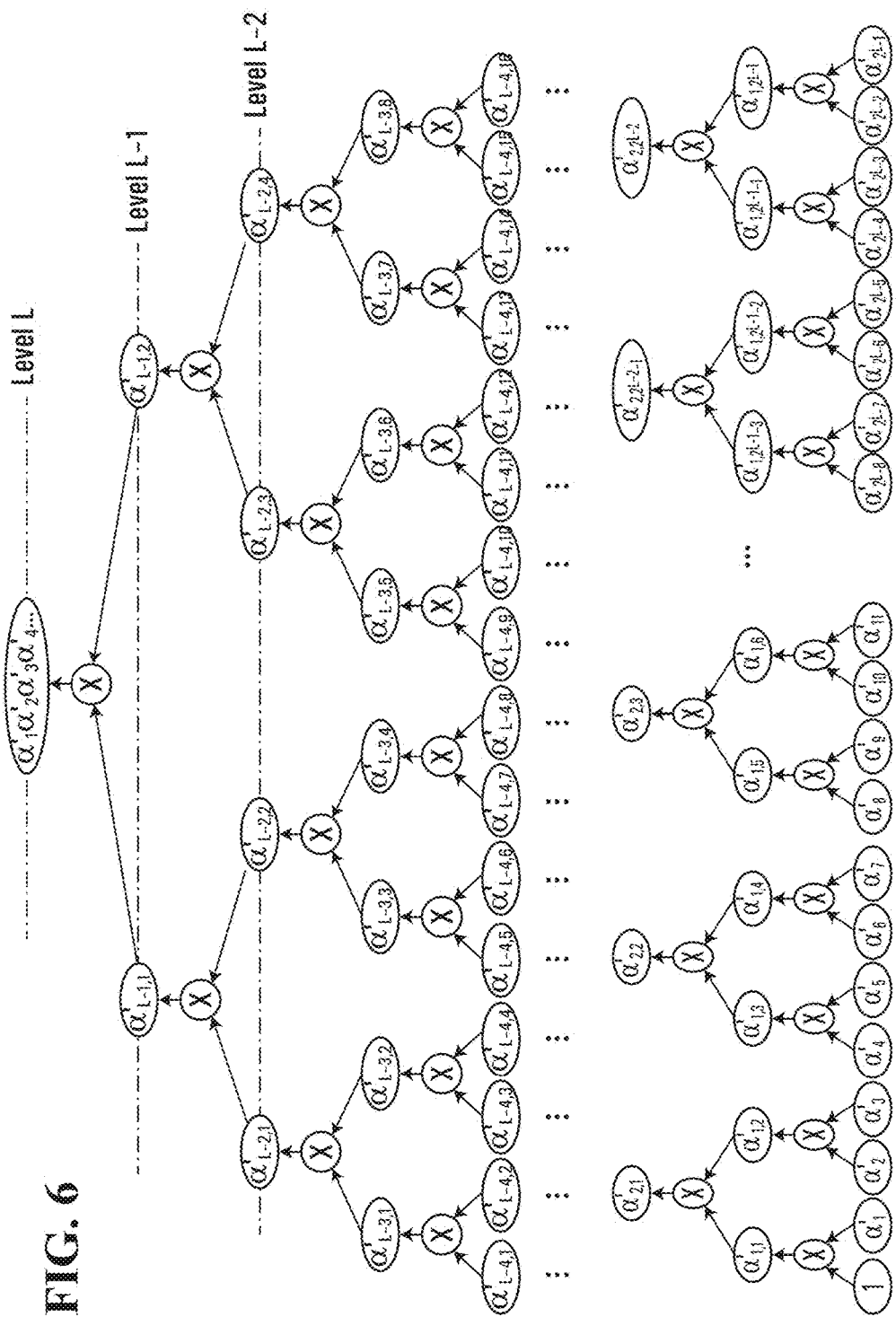
FIG. 6 illustrates an example parallel span for complementary alphas in a binary mix tree.

FIG. 6 illustrates an example parallel span for complementary alphas in a binary mix tree. FIG. 6 indicates:
1) if viewing the schematic graph from bottom to top, a pair of alphas from an odd node and an even node forms an upper-level alpha, although alphas from odd nodes are not applied to the A/B mix formula in 2-8, generally;

2) if viewing the schematic graph from top to bottom, at level L the right-hand side complementary alpha is used for the final node output (see Eq. 2-3) while the left-hand side complementary alpha only involves calculations starting at level L−2.

General complementary alpha and composite complementary alpha expressions are populated in Table 1 below.

precisions. Although the traditional cascade A/B mix tree employs limited precision of alpha, using a unit with a 10-bit fractional part in decimal precision for instance, the alpha is not carried on to the following A/B mix layers and therefore no error spreads due to limited precision. In contrast, truncation errors due to limited precision could propagate in a parallel A/B mix tree.

TABLE 1 complementary alpha and composite complementary alpha expressions

| Level | Carry-on Complementary Alpha (Composite Complementary Alpha for Levels above 0) |
|---|---|
| L-1 | $\alpha'_{L-1,2} = \prod_{i=1\cdot 2^{L-1}}^{2\cdot 2^{L-1}-1} \alpha'_i = \prod_{i=2\cdot 2^{L-2}}^{3\cdot 2^{L-2}-1} \alpha'_i \times \prod_{i=3\cdot 2^{L-2}}^{4\cdot 2^{L-2}-1} \alpha'_i = \alpha'_{L-2,3} \times \alpha'_{L-2,4}$ |
| L-2 | $\alpha'_{L-2,2} = \prod_{i=1\cdot 2^{L-2}}^{2\cdot 2^{L-2}-1} \alpha'_i = \prod_{i=2\cdot 2^{L-3}}^{4\cdot 2^{L-3}-1} \alpha'_i = \alpha'_{L-3,3} \times \alpha'_{L-3,4} \qquad \alpha'_{L-2,4} = \prod_{i=3\cdot 2^{L-2}}^{4\cdot 2^{L-2}-1} \alpha'_i = \prod_{i=6\cdot 2^{L-3}}^{8\cdot 2^{L-3}-1} \alpha'_i = \alpha'_{L-3,7} \times \alpha'_{L-3,8}$ |
| L-3 | $\alpha'_{L-3,2} = \prod_{i=1\cdot 2^{L-3}}^{2\cdot 2^{L-3}-1} \alpha'_i \qquad \alpha'_{L-3,4} = \prod_{i=3\cdot 2^{L-3}}^{4\cdot 2^{L-3}-1} \alpha'_i \qquad \alpha'_{L-3,6} = \prod_{i=5\cdot 2^{L-3}}^{6\cdot 2^{L-3}-1} \alpha'_i \qquad \alpha'_{L-3,8} = \prod_{i=7\cdot 2^{L-3}}^{8\cdot 2^{L-3}-1} \alpha'_i$ |
| L-4 | $\prod_{i=1\cdot 2^{L-4}}^{2\cdot 2^{L-4}-1} \alpha'_i \quad \prod_{i=3\cdot 2^{L-4}}^{4\cdot 2^{L-4}-1} \alpha'_i \quad \prod_{i=5\cdot 2^{L-4}}^{6\cdot 2^{L-4}-1} \alpha'_i \quad \prod_{i=7\cdot 2^{L-4}}^{8\cdot 2^{L-4}-1} \alpha'_i \quad \prod_{i=9\cdot 2^{L-4}}^{10\cdot 2^{L-4}-1} \alpha'_i \quad \prod_{i=11\cdot 2^{L-4}}^{12\cdot 2^{L-4}-1} \alpha'_i \quad \prod_{i=13\cdot 2^{L-4}}^{14\cdot 2^{L-4}-1} \alpha'_i \quad \prod_{i=15\cdot 2^{L-4}}^{16\cdot 2^{L-4}-1} \alpha'_i$ |
| ... | ... |
| 1 | $\alpha'_{1,2} = \alpha'_2 \cdot \alpha'_3 \quad \alpha'_{1,4} = \alpha'_6 \cdot \alpha'_7 \qquad\qquad\qquad \alpha'_{1,2^{L-1}-2} = \alpha'_{2^L-6}\alpha'_{2^L-5} \quad \alpha'_{1,2^L-1} = \alpha'_{2^L-2}\alpha'_{2^L-1}$ |
| 0 | $\alpha'_1 \quad \alpha'_3 \quad \alpha'_5 \quad \alpha'_7 \qquad\qquad\qquad \alpha'_{2^L-7} \quad \alpha'_{2^L-5} \quad \alpha'_{2^L-3} \quad \alpha'_{2^L-1}$ |

In order to easily understand the composite alphas, Table 2 lists all alpha indices for complementary alphas and composite complementary alphas from an instance of 5 levels or 32 video layers.

TABLE 2 alpha indices for 5-level parallel tree

| Level | Carry-on Complementary Alpha (Composite Complementary Alpha for Levels above 0) |
|---|---|
| 4 | $\alpha'_{16}\alpha'_{17}\alpha'_{18}\alpha'_{19}\alpha'_{20}\alpha'_{21}\alpha'_{22}\alpha'_{23}\alpha'_{24}\alpha'_{25}\alpha'_{26}\alpha'_{27}\alpha'_{28}\alpha'_{29}\alpha'_{30}\alpha'_{31}$ |
| 3 | $\alpha'_8\alpha'_9\alpha'_{10}\alpha'_{11}\alpha'_{12}\alpha'_{13}\alpha'_{14}\alpha'_{15} \qquad \alpha'_{24}\alpha'_{25}\alpha'_{26}\alpha'_{27}\alpha'_{28}\alpha'_{29}\alpha'_{30}\alpha'_{31}$ |
| 2 | $\alpha'_4\alpha'_5\alpha'_6\alpha'_7 \quad \alpha'_{12}\alpha'_{13}\alpha'_{14}\alpha'_{15} \quad \alpha'_{20}\alpha'_{21}\alpha'_{22}\alpha'_{23} \quad \alpha'_{28}\alpha'_{29}\alpha'_{30}\alpha'_{31}$ |
| 1 | $\alpha'_2\alpha'_3 \quad \alpha'_6\alpha'_7 \quad \alpha'_{10}\alpha'_{11} \quad \alpha'_{14}\alpha'_{15} \quad \alpha'_{18}\alpha'_{19} \quad \alpha'_{22}\alpha'_{23} \quad \alpha'_{26}\alpha'_{27} \quad \alpha'_{30}\alpha'_{31}$ |
| 0 | $\alpha'_1 \quad \alpha'_3 \quad \alpha'_5 \quad \alpha'_7 \quad \alpha'_9 \quad \alpha'_{11} \quad \alpha'_{13} \quad \alpha'_{15} \quad \alpha'_{17} \quad \alpha'_{19} \quad \alpha'_{21} \quad \alpha'_{23} \quad \alpha'_{25} \quad \alpha'_{27} \quad \alpha'_{29} \quad \alpha'_{31}$ |

Carry-on Precisions

As discussed above, the upper A/B mix node data are formed from lower node data in a parallel binary tree, and composite complementary alphas are also formed from lower node complementary alphas. The complementary alphas carry on through the binary tree from bottom to top. These carry-on complementary alphas could raise a question of precision in a parallel mix tree due to limited alpha precisions.

Error Analysis

Mixed Video

Consider an example in which each A/B mix has a truncation error $\varepsilon_i$ at layer i and the final result $O_{mix}$ has a total error $E_v$ in N layers of a mix tree. Due to truncation rather than rounding, the total error $E_v$ is subtracted from $O_{mix}$ to produce the real result, such that $$O_{mix} - E_v = ((((B\alpha'_1 + F_1\alpha_1 - \varepsilon_1)\alpha'_2 + F_2\alpha_2 - \varepsilon_2)\alpha'_3 \ldots - \varepsilon_{N-2})\alpha'_{N-1} + F_{N-1}\alpha_{N-1} - \varepsilon_{N-1}) \qquad \text{Eq. 2-10}$$
$$\alpha'_N + F_N\alpha_N - \varepsilon_N$$
$$= ((((B\alpha'_1 + F_1\alpha_1)\alpha'_2 + F_2\alpha_2) \ldots )\alpha'_{N-1} + F_{N-1}\alpha_{N-1})\alpha'_N + F_N\alpha_N - (\varepsilon_1\alpha'_2 \ldots \alpha'_N) -$$
$$(\varepsilon_2\alpha'_3 \ldots \alpha'_N) - \cdots - \varepsilon_N$$
$$= O_{mix} - ((\varepsilon_1\alpha'_2 \ldots \alpha'_N) + (\varepsilon_2\alpha'_3 \ldots \alpha'_N) + \cdots + \varepsilon_N)$$

In order to find the maximum error, consider an example in which all layers have the same maximum truncation error ε and all layers have the same complementary alpha value α'. Eq. 2-10 then produces the total error $$E_v = (\varepsilon_1 \alpha'_2 \ldots \alpha'_N) + (\varepsilon_2 \alpha'_3 \ldots \alpha'_N) + \cdots + (\varepsilon_{N-2} \alpha'_{N-1} \alpha'_N) + \varepsilon_{N-1} \alpha'_N + \varepsilon_N$$
$$= \varepsilon(\alpha'^{N-1} + \alpha'^{N-2} + \cdots + \alpha' + 1)$$
$$= \varepsilon \frac{1 - \alpha'^N}{1 - \alpha'}$$

Eq. 2-11

Carry-on Alpha

Now suppose that a carry-on alpha is in the worst case where all complementary alphas are carried on through a mix tree to the top layer such that $$\alpha'_{mix} = \prod_{i=1}^{N} \alpha'_i,$$

Eq. 2-12 where N is the number of layers

When implementing Eq. 2-12, truncation error $\varepsilon_i$ is introduced to layer i. Due to the truncation, the total error $E_\alpha$ is subtracted from to $\alpha'_{mix}$ to produce the final result such that $$\alpha'_{mix} - E_\alpha = (((\alpha'_1 \alpha'_2 - \varepsilon_2)\alpha'_3 - \varepsilon_3)\alpha'_4 \ldots \alpha'_{N-1} - \varepsilon_{N-1})$$
$$\alpha'_N - \varepsilon_N$$
$$= \prod_{i=1}^{N} \alpha'_i - (\varepsilon_2 \alpha'_3 \alpha'_4 \ldots \alpha'_N) - (\varepsilon_3 \alpha'_4 \ldots \alpha'_N) - \cdots - (\varepsilon_{N-1} \alpha'_N) - \varepsilon_N$$

Eq. 2-13

In order to find the maximum error, further consider an example in which each layer has the same maximum truncation error ε and each layer uses the same complementary alpha value α'. The total error in Eq. 2-13 is expressed such that $$E_\alpha = \varepsilon_2 \alpha'^{N-2} + \varepsilon_3 \alpha'^{N-3} + \cdots + \varepsilon_{N-1} \alpha' + \varepsilon_N \quad \text{if } \alpha'_1 = \alpha'_2 = \cdots = \alpha'_{N-1} = \alpha'_N = \alpha'$$
$$= \varepsilon \frac{1 - \alpha'^{N-1}}{1 - \alpha'} \quad \text{if } \varepsilon_1 = \varepsilon_2 = \cdots = \varepsilon_{N-1} = \varepsilon_N = \varepsilon$$

Eq. 2-14

Figure 7:
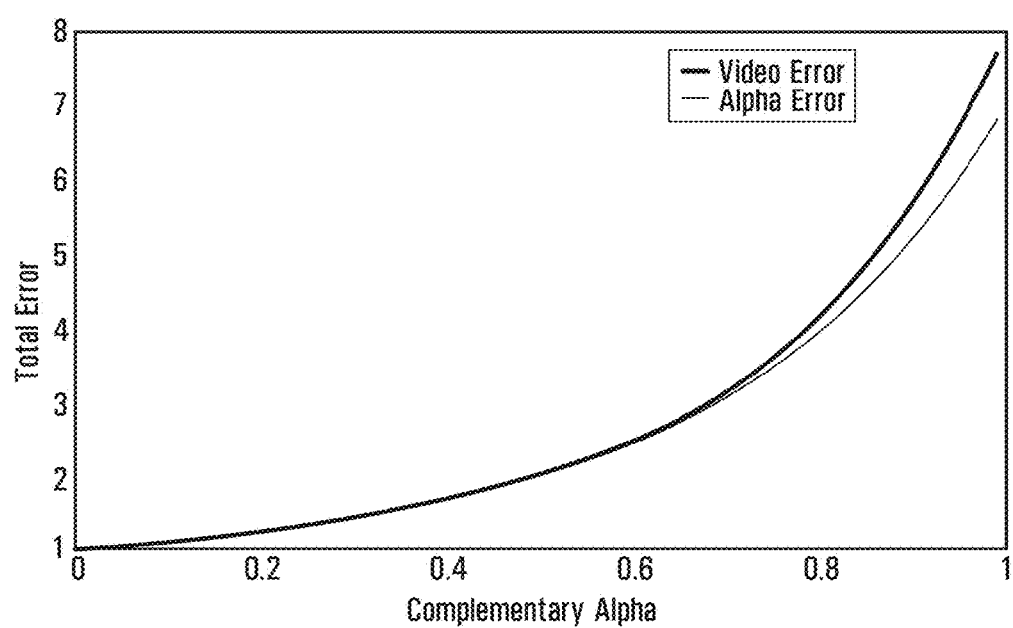
FIG. 7 is an example plot of errors for video data and alpha signals in terms of complementary alpha values.
Figure 8A:
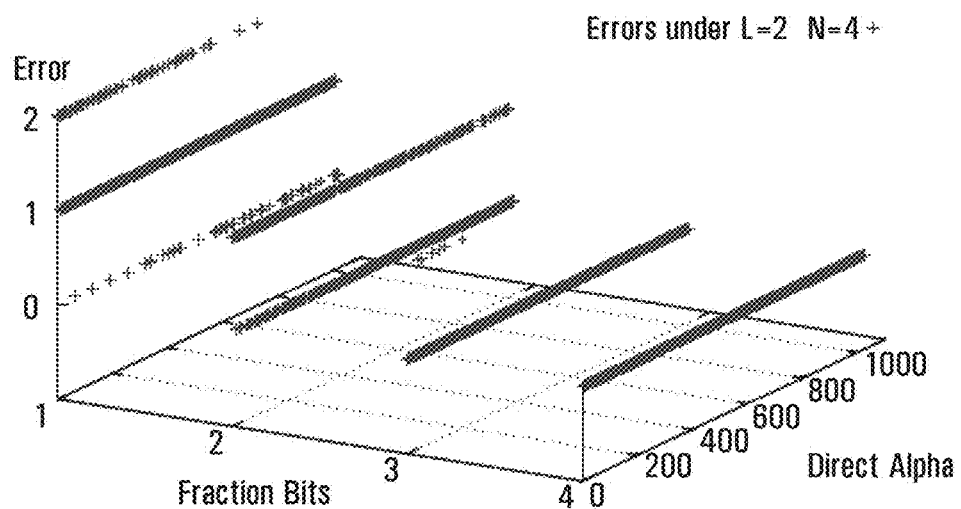
FIGS. 8A to 8D are example plots of total errors in terms of various video calculation fractional precisions and various source alpha values for N=4, 8, 32, and 64 layers mix trees (with L=2, 3, 5, and 6 levels), respectively.
Figure 8B:
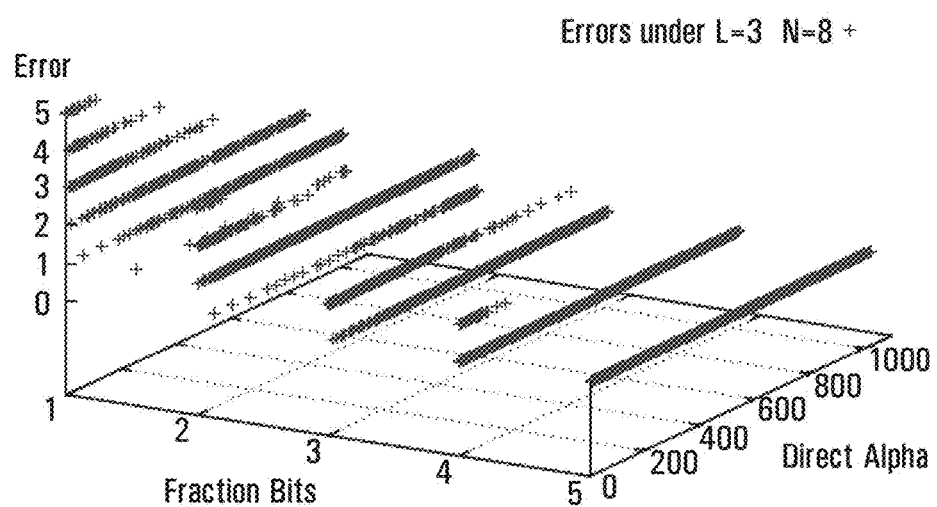
Figure 8C:
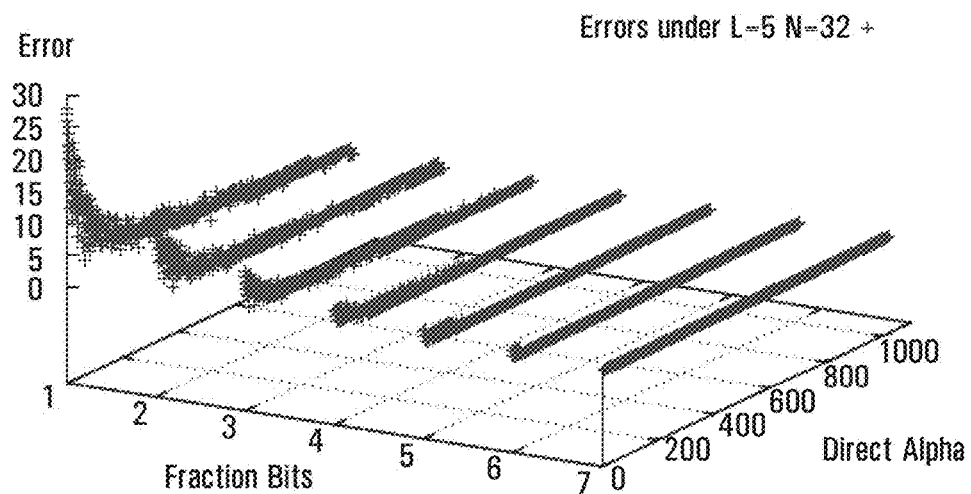
Figure 8D:
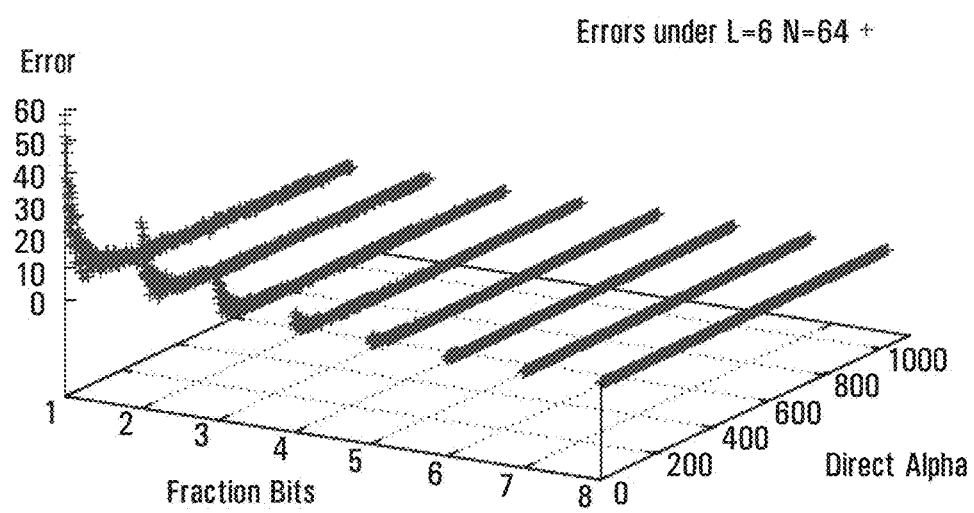
Figure 9A:
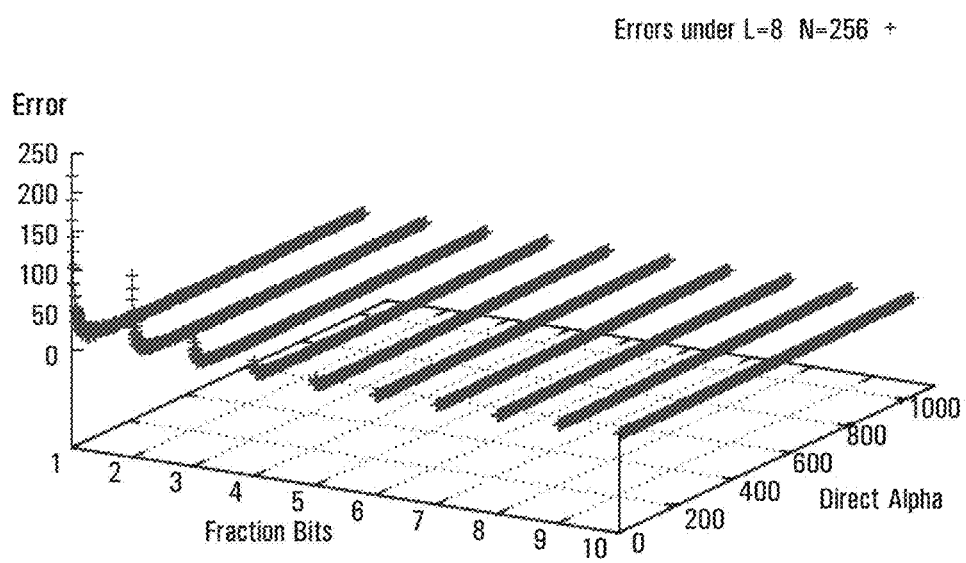
FIG. 9A is an example plot of total errors in terms of various video calculation fractional precisions and various source alpha values for N=256 layers with L=8.
Figure 9B:
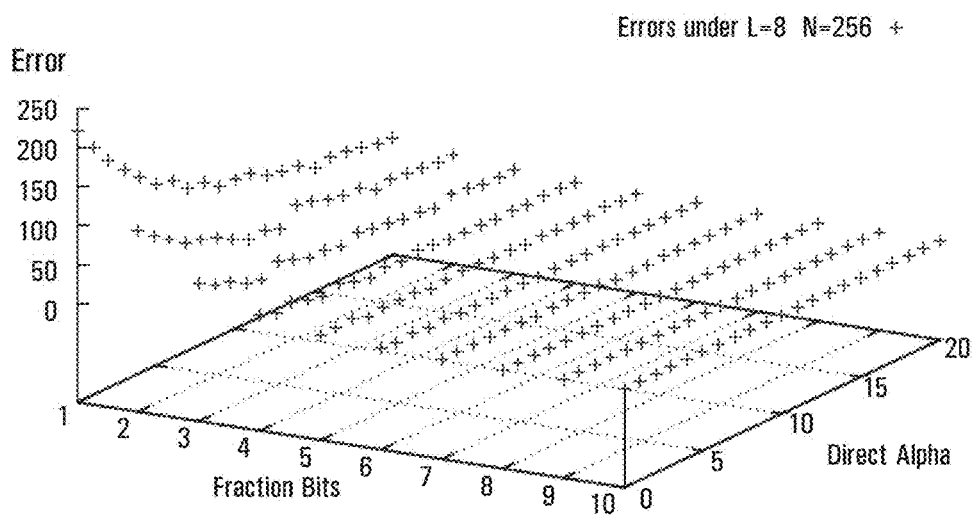
FIG. 9B is a magnified view of a portion of FIG. 9A.
Figure 10A:
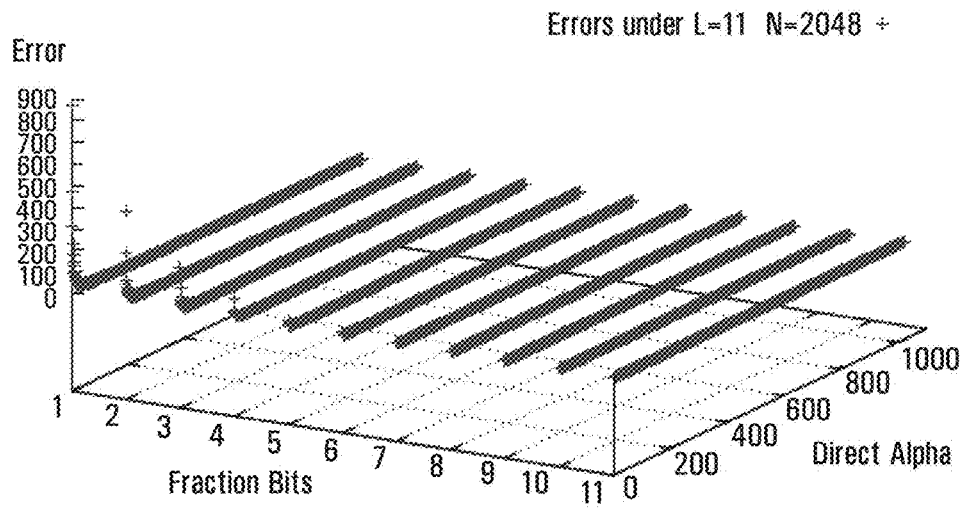
FIG. 10A is an example plot of total errors in terms of various video calculation fractional precisions and various source alpha values for N=2048 layers with L=11.
Figure 10B:
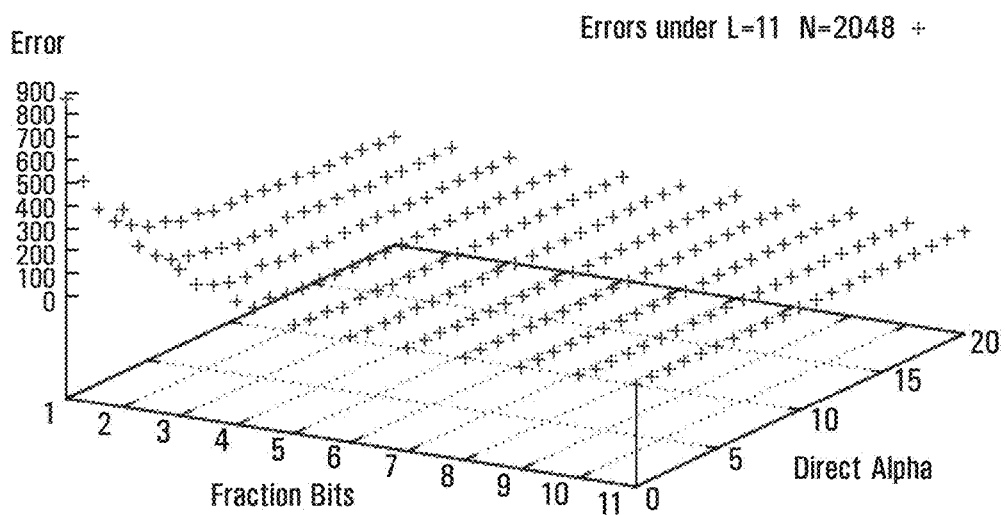
FIG. 10B is a magnified view of a portion of FIG. 10A.

Eq. 2-14 is similar to Eq. 2-11, and both are shown in FIG. 7, which is an example plot of errors for video data and alpha signals in terms of complementary alpha values under N=8 video layers. This similarity between Eq. 2-11 and Eq. 2-14 might direct focus to the video error because video error is larger than alpha error.

Maximum Error

Eq. 2-11 and Eq. 2-14 disclose that the total accumulated error monotonically increases with complementary alpha values and hence the maximum error occurs at maximum complementary alpha value (unit of alpha) such that $$E_{max} = N\varepsilon, \text{ if } \alpha' = 1$$

Eq. 2-15

α'=1 means that each upper layer is transparent to lower layers and so the lower layers' errors are visible. In contrast, α'=0 means that each upper layer blocks lower layers and also prevents error propagation from the lower layers. If the total error is limited to a certain value such as $2^{-M}$ in terms of a unit, then $E_{max} \leq 2^{-M}$ and the maximum truncation error ε in each layer follows $$\varepsilon \leq \frac{2^{-M}}{2^L} = \frac{1}{2^{L+M}} \leq \frac{1}{N},$$

Eq. 2-16 where $2^{L-1} < N \leq 2^L$

Eq. 2-16 can be interpreted as a general target or guide for each layer truncation to sustain a certain calculation accuracy. This target defines each layer truncation with the number of fraction bits equal to (L+M). According to Eq. 2-16, M=0 means a 1-bit error and M=2 means a quarter-bit error. A quarter-bit error might be chosen for certain applications, for example, in which after rounding to integer is applied to the end video mixing result, an error-free $O_{mix}$ is produced for the case where all layers are from identical video sources, such that $$\lfloor O_{mix} - E_{max} + 0.5 \rfloor = \lfloor O_{mix} - 0.25 + 0.5 \rfloor = \lfloor O_{mix} + 0.25 \rfloor = O_{mix},$$

Eq. 2-17 where ⌊ ⌋ is truncation to integer

A quarter-bit error might be preferred, for example, to give more guard margin to a system than a half-bit error.

In order to verify the above analysis on the total error from Eq. 2-11 and Eq. 2-14, C programs were used to sweep parameters and find the maximum error. C-Code 2-1 below lists C code where 3 parameters, including video data, direct alpha value, and number of additional fraction bits, are swept in ranges, one after the other.

```
const int    L = 10;              // number of levels
const int    N = 1<<L;            // number of layers
static int   aBuf[2*N];           // alpha buffer holds alpha source & result in each level
static int   vBuf[2*N];           // video buffer holds video source & result in each level
static int   aFRC;    // the number of fraction bits in each truncation
static int   aBit;    // the total number of bits for video and alpha
void sweep_all( void ){
    int    max_frc=L+2;           // L+M where M=2
    if(max_frc>11)                // L+M has no need for more bits than 11
        max_frc = 11;
    // sweep 10-bit video data
    for(int video=1; video<1024; video++){
        ... ... ...
        // sweep 10-bit alphas
```

```
        for(int alpha=0; alpha<1024; alpha++){
            ... ... ...
            // sweep fractions
            for(int frc_cnt=1; frc_cnt<=max_frc; frc_cnt++){
                aFRC = frc_cnt;
                aBit = 10 + aFRC;
                data = run_full_parallel( );
                data >>= aFRC-1;    // rounding is performed because
                data += 1;          // each layer does truncation only, and
                data >>= 1;         // thus always produces negative errors.
                error = video-data; // total error between source and mix output
            }
        }
    }
}
```

C-Code 2-1: Sweep of Values in Terms of Alpha, Video, and Fractions

Note that:
1) In this example, 10-bit fractional precision source alphas are considered. Maximum additional fraction bits, specifying fractional precision for mix results and additional fractional precision for alpha values, are not beyond 11 bits in some embodiments. It has been found that fractional precision of more than 11 bits sustained by each mix result truncation in this example might not be helpful for error reduction. Fractional precision of alpha values and fractional precision sustained by each truncation, as referenced in this example, might be the same number of bits but the effects of such bits are different.
For example, when a source alpha of 10-bit fractional precision is multiplied by 10-bit integer video data, the product is 20-bit fixed point data, including a 10-bit fractional part and a 10-bit integer part. Truncation after multiplication may cut 20-bit data to 15 bits, for instance, by sustaining 5-bit fractional precision. Note that, in the present disclosure, the product with 5-bit fractional precision from one mixing module may be a video data input to another mixing module. When this new video data input is multiplied with a source alpha of 10-bit fractional precision, the further new product is 25-bit fixed point data, including a 10-bit integer part and a 15-bit fractional part. If the product is to be truncated to 15 bits including a 10-bit integer part and a 5-bit fractional part, then 10 bits are to be cut.
In C-Code 2-1 and 2-2, consider an example of 10-bit video data, 10-bit fractional precision alpha data, and each truncation sustaining 5-bit fractional precision. Appending 5-bit 0s to both the video and alpha data provides video data with a 10-bit integer part and a 5-bit fractional part, and alpha data with 15-bit fractional precision. The alpha data could also have an integer part, illustratively with 10 bits, but only the least significant bit would be non-zero for alpha values between 0 and 1. Next, each mix is to multiply 15-bit video data with the alpha data, and could cut the 30-bit product (10-bit integer and 20-bit fraction) to 15 bits by dropping the last 15 bits of the fractional part. The product is keeping 15 bits (10-bit integer, 5-bit fraction). This is done recursively in multiplications for further mixing. In this example, the 5-bit fraction illustrates what is meant by sustaining 5-bit fractional precision in mix result truncation, and this can extend to other fractional precisions as well.

For additional fractional precision for alpha values, in the case of 5 bits additional precision as an example, the 5 bits are additional fractional precision. Truncation of mix results to 5-bit fractional precision as discussed above results in 15-bit video data, including a 10-bit integer value and a 5-bit fraction value. A 15-bit alpha value including 5 bits of additional fractional precision, however, could have all 15 bits specifying a fractional value for alpha values between 0 and 1. Thus, the number of fraction bits in mix result truncation and the number of bits of additional fractional precision for alpha values could be the same L+M target value, but the effects are different, in that the mix result truncation (to 5 bits in this example) is the entirety of fractional precision for the mix results whereas the additional fractional precision for alpha values (again, 5 bits in this example) is additional alpha precision and not the entirety of alpha precision (10 bits source alpha plus 5 bits additional precision for alpha, for 15-bit total fractional precision for alpha in this example).

More generally in respect of alpha values, although reference might be made to integer and fraction parts for alpha, it should be noted that for alpha values between 0 and 1, the integer and fraction parts could together actually define a fractional value for alpha values other than 0 and 1. "Integer" and "fraction" are used solely for notation in reference to alpha, and should not be interpreted as defining an integer value for alpha and a separate fractional value for alpha. For alpha values between 0 and 1, these alpha parts may together define fractional values.

2) Two buffers {aBuf, vBuf}, which are double-sized relative to the number of layers, contain source video and source alpha in the first half of arrays, respectively. The other half takes intermediate calculation results.

3) The final mix result is rounded by adding 0.5 and truncating to integer.

4) In this example, a full parallel structure for a mix tree is to run in a function run_full_parallel( ), which is listed in C-Code 2-2 below.

```
int run_full_parallel( void ){
    int src_addr = 0;       // source address in each level
    int tgt_addr = N;       // target address in each level
    int pair_num = N;       // number of A/B mix in each level
    for(int level_cnt=0; level_cnt<L; level_cnt++){
        pair_num >>=1;      // pair number reduces to half
```

-continued

```
        for(int pair_cnt=0; pair_cnt<pair_num; pair_cnt++){
            aBuf[tgt_addr] = (aBuf[src_addr+0] * aBuf[src_addr+1])
            >>aBit; // truncation
            vBuf[tgt_addr] = (vBuf[src_addr+0] * aBuf[src_addr+1])
            >>aBit; // truncation
            vBuf[tgt_addr] += vBuf[src_addr+1];
            tgt_addr++;
            src_addr += 2;
        }
    }
    return vBuf[src_addr];
}
```

C-Code 2-2: Example Parallel Implementation of Mix Tree

Figure 11:
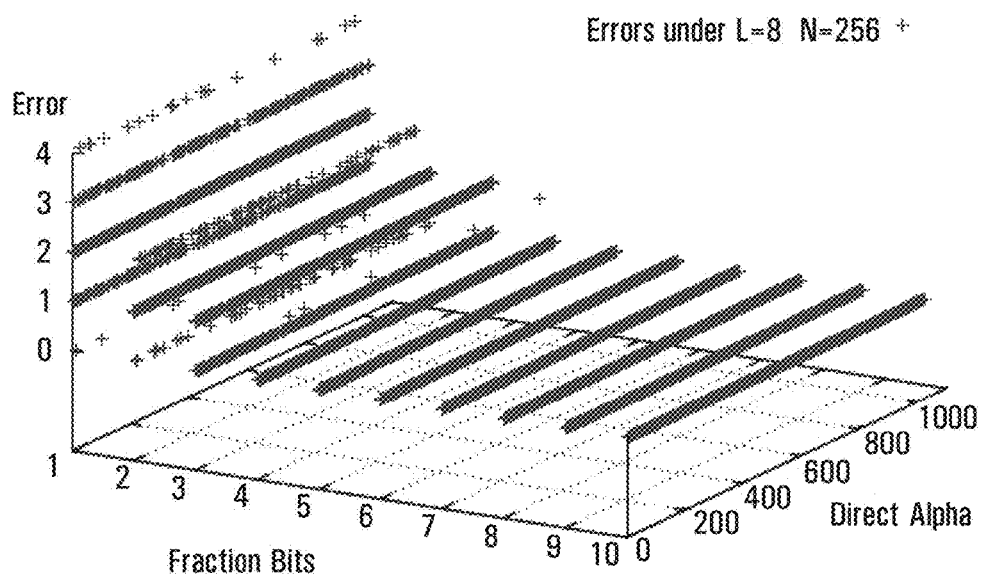
FIG. 11 is an example plot of errors in terms of various video calculation precisions and random source alpha values for N=256 layers with L=8, for fractional precision from 1 to 10 bits but a smaller error range than in FIGS. 9A and 9B.
Figure 12:
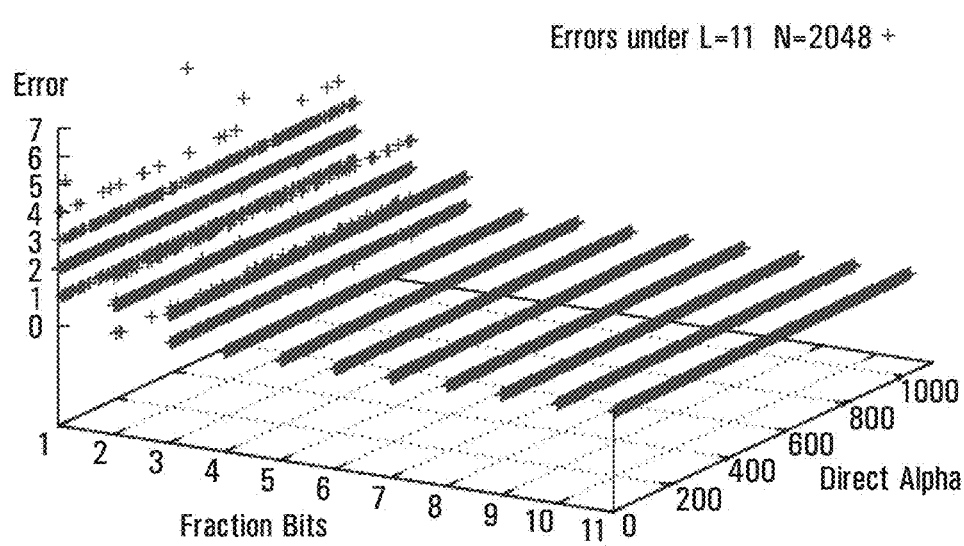
FIG. 12 is an example plot of errors in terms of various video calculation precisions and random source alpha values for N=2048 layers with L=11, for fractional precision from 1 to 11 bits but a smaller error range than in FIGS. 10A and 10B.

Example sweep results are plotted in FIGS. 8A to 12, in which FIGS. 8A to 8D are example plots of total errors in terms of various video calculation fractional precisions and various source alpha values for 4, 8, 32, and 64 layers (L=2, 3, 5, and 6), respectively; FIG. 9A is an example plot of total errors in terms of various video calculation fractional precisions and various source alpha values for 256 layers with L=8 and FIG. 9B is a magnified view of a portion of FIG. 9A; FIG. 10A is an example plot of total errors in terms of various video calculation fractional precisions and various source alpha values for 2048 layers with L=11 and FIG. 10B is a magnified view of a portion of FIG. 10A; FIG. 11 is an example plot of errors in terms of various video calculation precisions and random source alpha values under 256 layers with L=8 for fractional precision from 1 to 10 bits but a smaller error range than in FIGS. 9A and 9B; and FIG. 12 is an example plot of errors in terms of various video calculation precisions and random source alpha values under 2048 layers with L=11 for fractional precision from 1 to 11 bits but a smaller error range than in FIGS. 10A and 10B.

Note that:
1) All of the example sweeps produce 0 errors when each layer truncation sustains (L+M) bits for fractional precision, or the maximum 11 bits for L=11.
2) FIGS. 8A to 10B use identical alpha values in each layer, swept from 1 to 1024.
3) FIGS. 11 and 12 use random alpha values to replace sweep values.

From these sweep results, it can be observed that:
1) Seamless error-free switching between layers with identical video values can be realized in parallel structures under a condition that each layer sustains truncation with L+M bits fractional precision. Such a condition is referred to herein as a target of (L+M) bits for fraction in truncation.
2) Truncation is applied to each layer mix in some embodiments, and then the mix result is always equal to or smaller than a real value. Rounding could also be applied to the final mix result. Overflow does not occur due to the rounding because of the truncation in each layer.
3) Maximum error occurs under the condition of identical alpha value for every layer with direct alpha values approaching zero (or complementary alpha values approaching one unit).
4) If random alpha values replace the identical alpha values and distribute through all layers, total errors are low compared with the case of identical alpha value for all layers. This is because large values of direct alpha are widely distributed in middle layers and any upper large alpha value blocks all lower visibilities and prevents errors from further propagation.

Quarter-bit error or error tolerance as discussed above is intended solely for illustrative purposes. Other errors or error tolerances are possible. A maximum error or error tolerance could be chosen for video effects and mix processing, and fractional precision could then be set based on the error or error tolerance. For different error or error tolerances, there could be different fractional precisions. For example, for the same L, a lower error or error tolerance (higher M) involves a higher fractional precision (L+M), and conversely a lower fractional precision can be used under a higher error tolerance (lower M) condition.

In some embodiments, when a maximum error or error tolerance is chosen, the same fixed fractional precision is used for video effects and mix processing. Other embodiments could support different maximum errors or error tolerances and different fractional precisions for different video effects, for example. It is also contemplated that maximum error or error tolerance values, fractional precisions, or both could be changed, as configuration settings for instance. This could enable changes to maximum error or error tolerance, for particular video effects or mix processing or for a video effects or mix processing system as a whole, by changing settings for maximum error or error tolerance and/or for fractional precision. Error or error tolerance settings, fractional precision settings, or both types of settings, could be configured in registers or other types of memory, for example. As discussed herein in terms of an (L+M) target, fractional precision could be calculated from maximum error or error tolerance, and therefore configuration settings could include either or both of error/tolerance settings and fractional precision settings.

Partial Parallel Structure

Full parallel structures might use higher precisions for A/B mix calculations to avoid accumulated errors. The more layers and the higher the number of levels that a mix tree involves, the higher precisions the mix tree should use and the higher the implementation cost. A tradeoff between performance and implementation cost is a partially parallel structure within a main cascade tree. For instance, a main trunk in a mix tree could still be a cascade structure while multiple branches could be paralleled to reduce electronic delays.

Parallel Pairs

A parallel pair could be considered a simplest instance of a partial parallel structure. In order to clarify the mathematical meaning, Eq. 2-1 is re-written as:

$$O_{mix} = ( \ldots (((((B\alpha'_1 + \hat{F}_1)\alpha'_2 + \hat{F}_2)\alpha'_3 + \hat{F}_3)\alpha'_4 + \hat{F}_4)\alpha'_5 + \hat{F}_5)\alpha'_6 + \hat{F}_7) \ldots )\alpha'_{2^L-1} + \hat{F}_{2^L-1} \quad \text{Eq. 2-18}$$

$$= (( \ldots ((B\alpha'_1 + \hat{F}_1)\alpha'_2\alpha'_3 + (\hat{F}_2\alpha'_3 + \hat{F}_3))\alpha'_4\alpha'_5 + (\hat{F}_4\alpha'_5 + \hat{F}_5) \ldots )\alpha'_{2 \cdot 2^{L-1}-2} + \hat{F}_{2 \cdot 2^{L-1}-2})$$

$$\alpha'_{2 \cdot 2^{L-1}-1} + \hat{F}_{2 \cdot 2^{L-1}-1}$$

$$= ( \ldots (( \ldots (((O_{0:1}\alpha'_{2:3} + O_{2:3})\alpha'_{2:3} + O_{4:5})\alpha'_{6:7} + O_{6:7}) \ldots )\alpha'_{2i:2i+1} + O_{2i:2i+1}) \ldots )$$

$$\alpha'_{2n-2:2n-1} + O_{2n-2:2n-1}$$

where $O_{2i:2i+1} = \hat{F}_{2i}\alpha_{2i+1} + \hat{F}_{2i+1}$, $\alpha'_{2i:2i+1} = \alpha'_{2i}\alpha'_{2i+1}$, $n = 2^{L-1}$, $i = 0, 1, \ldots, n-1$ Note that the notation of subscript i:j means the output data from sources from i to j. This is different from previous subscript notation i,j which means node j at level i.

Figure 13:
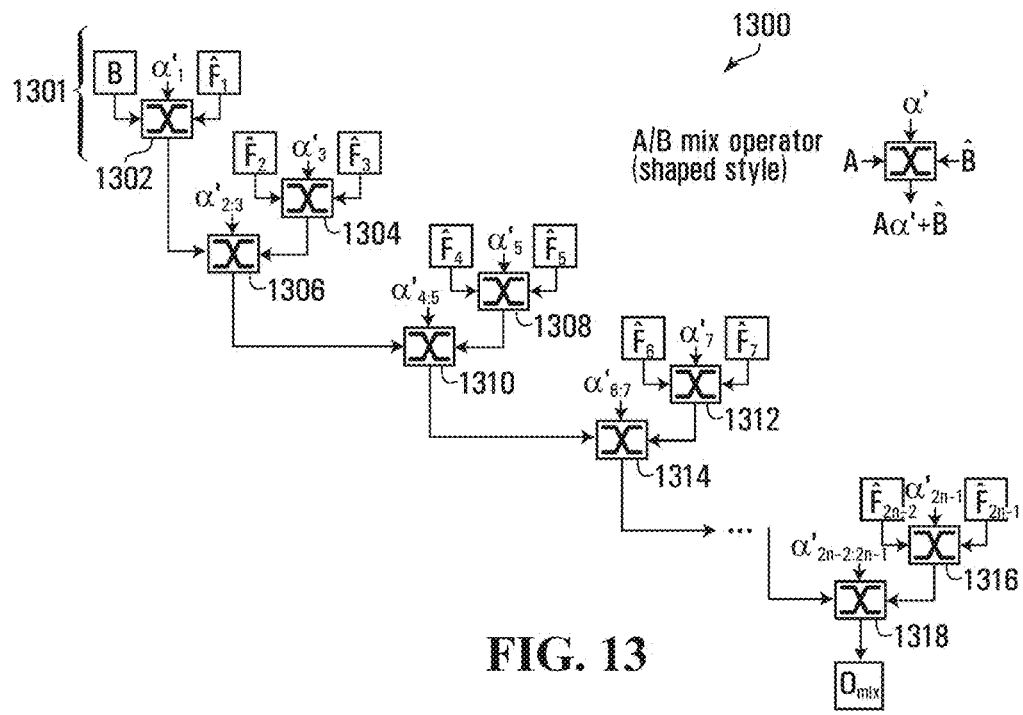
FIG. 13 is a block diagram illustrating an example structure of cascaded parallel pairs.

FIG. 13 is a block diagram illustrating an example structure of cascaded parallel pairs, in which every pair independently implements A/B mixing without composite alpha carry-on to the output $O_{mix}$.

A parallel pair in the example structure of FIG. 13 is shown at 1301, and includes an A/B mix operator 1302 to perform A/B mixing on two video sources, including a background video source B, and a shaped foreground video source $\hat{F}_i$. Other A/B mix operators 1304, 1308, 1312, and 1316 similarly implement other parallel pairs and perform A/B mixing on other video sources. The A/B mix operators 1306, 1310, 1314, and 1318 are cascaded to perform A/B mixing on the outputs of parallel pairs. The A/B mix operator 1306 performs A/B mixing on the outputs of two parallel pairs, and the mix operators 1310, 1314, and 1318 each perform A/B mixing on outputs from one parallel pair and a preceding mix operator in the cascade. The output $O_{mix}$ is the final output from the last A/B mix operator 1318 in the example structure 1300.

The example parallel structure 1300 is a partial parallel structure, since it combines parallel structures in the form of parallel pairs and cascaded mix operators 1306, 1310, 1314, and 1318.

Figure 21:
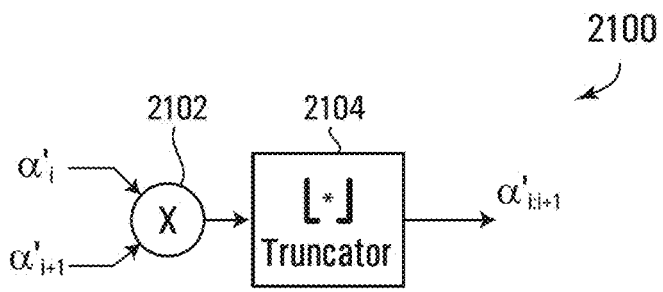
FIG. 21 is a block diagram illustrating an example device to implement a fuzzy logic-AND operation.
Figure 22A:
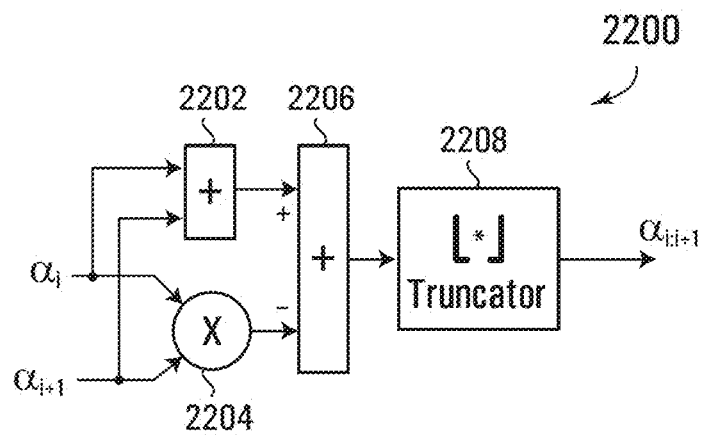
FIG. 22A is a block diagram illustrating an example device to implement a fuzzy logic-OR operation.

In a more general sense, each of the mix operators shown in FIG. 13 is an example of a video data mixing module to mix video data inputs. Some of the mix operators, and specifically the mix operators 1306, 1310, 1314, and 1318 mix their video data inputs according to respective composite mix parameter signals. In the example structure 1300, these composite mix parameter signals are composite complementary alpha signals, $\alpha'_{i:j}$. As discussed in detail herein, the composite complementary alpha signals, $\alpha'_{i:j}$ are computed from alpha signals that are respectively associated with multiple video data inputs. More generally, composite mix parameter signals are computed from mix parameter signals respectively associated with multiple video data inputs. In an embodiment, the composite mix parameter signals correspond to a product of mix parameter signals that are based on mix parameter signals respectively associated with multiple video data inputs. As an example, alpha signals could be associated with respective video source signals, complementary alpha signals are based on the alpha signals, and composite complementary alpha signals correspond to products of complementary alpha signals, as shown in Eq. 2-5, Eq. 2-6, Eq. 2-7, and Eq. 2-9. Composite mix parameter signals could, but need not necessarily, be computed as a product as shown in FIGS. 21 and 22A discussed below, for example. In either case, however, composite mix parameter signals still could correspond to a product of multiple mix parameter signals whether they are calculated using a multiplier or a computation that is equivalent to a multiplication or product.

The example structure 1300 has a parallel pair at each of a number of levels providing one video data input to a cascaded mix operator 1306, 1310, 1314, and 1318. For a full parallel implementation, there might still be multiple levels, but with more than one parallel pair at each level, to implement the example binary tree in FIG. 5 for instance. In this type of implementation, there could be one or more video data mixing modules for each of a number of video effects layers to mix video data inputs according to composite mix parameter signals.

Parallel Quads

A parallel quad is a sub-parallel structure with four video sources. In order to clarify the mathematical meaning, Eq. 2-1 is re-written as:

$$O_{mix} = ( \ldots ((B\alpha'_1 + \hat{F}_1)\alpha'_2\alpha'_3 + (\hat{F}_2\alpha'_3 + \hat{F}_3))\alpha'_4\alpha'_5\alpha'_6\alpha'_7 + ((\hat{F}_4\alpha'_5 + \hat{F}_5)\alpha'_6\alpha'_7 + \quad \text{Eq. 2-19}$$

$$(\hat{F}_6\alpha'_7 + \hat{F}_7)) \ldots )\alpha'_{2 \cdot 2^{L-1}-1} + \hat{F}_{2 \cdot 2^{L-1}-1}$$

$$= (((O_{0:1}\alpha'_{2:3} + O_{2:3})\alpha'_{4:7} + (O_{4:5}\alpha'_{6:7} + O_{6:7}))\alpha'_{8:15} +$$

$$((O_{8:9}\alpha'_{10:11} + O_{10:11})\alpha'_{12:15} + (O_{12:13}\alpha'_{14:15} + O_{14:15}))) \ldots$$

$$= (((((O_{0:3}\alpha'_{4:7} + O_{4:7})\alpha'_{8:15} + (O_{8:11}\alpha'_{12:15} + O_{12:15}))\alpha'_{12:15} + \cdots )\alpha'_{4i:4i+3} + O_{4i:4i+3}) \ldots )$$

$$\alpha'_{4n-4:4n-1} + O_{4n-4:4n-1}$$

where $O_{4i:4i+3} = O_{4i:4i+1}\alpha'_{4i+2:4i+3} + O_{4i+2:4i+3}$, $\alpha'_{4i:4i+1} = \alpha'_{4i:4i+1}\alpha'_{4i+2:4i+3}$, $n = 2^{L-2}$, $i = 0, 1, \ldots n-1$.

Figure 14:
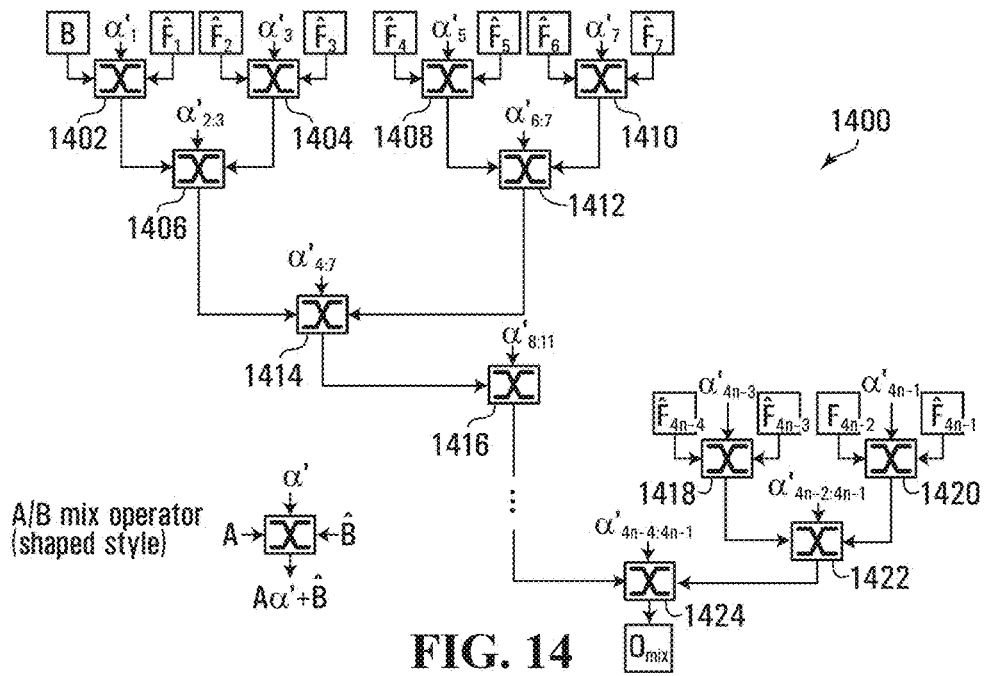
FIG. 14 is a block diagram illustrating an example structure of cascaded parallel quads.

FIG. 14 is a block diagram illustrating an example structure of cascaded parallel quads, in which every four video sources implement a parallel structure, independent of other parallel quads.

In the example structure 1400, each parallel quad includes two parallel pairs. The parallel pairs mixed by the A/B mix operators 1402 and 1404 are further mixed according to a composite mix parameter by the A/B mix operator 1406. Similarly, the parallel pairs mixed by the A/B mix operators 1408 and 1410 are further mixed according to a composite mix parameter by the A/B mix operator 1412. Another parallel quad is formed by the mix operators 1418 and 1420, which provide video data inputs to the mix operator 1422 for further mixing in accordance with its composite mix parameter signal. The mix operators 1406 and 1412 provide video data inputs to the mix operator 1414, which mixes its video data inputs according to a further composite mix parameter. The output $O_{mix}$ is the final output from the last A/B mix operator 1424 in the example structure 1400.

The mix operators 1414, 1416, and 1424 are cascaded, and accordingly the example structure 1400 is a further example of a partial parallel structure.

Combinations

Figure 15:
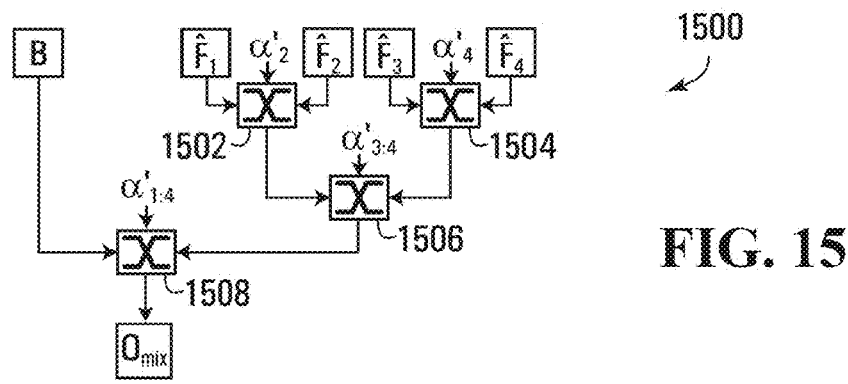
FIGS. 15 to 17 are block diagrams illustrating combinations of parallel structures.
Figure 16:
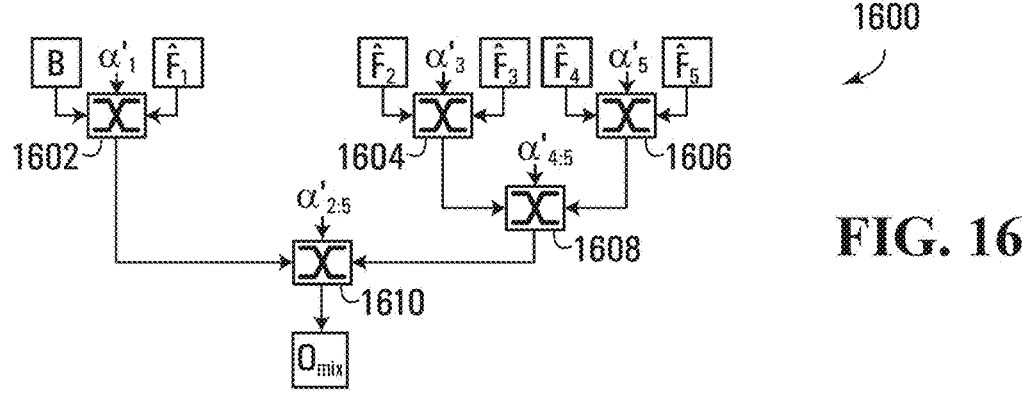
Figure 17:
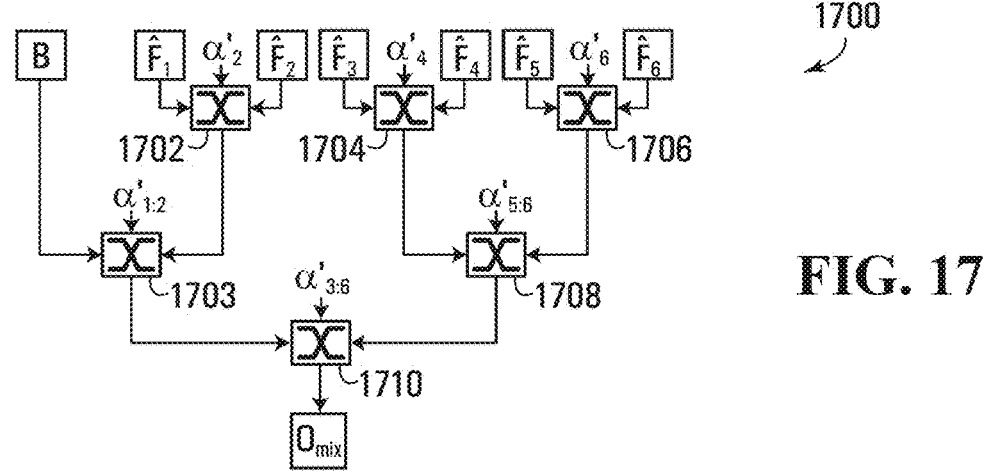

In some embodiments, there may be combinations of various parallel structures, depending on such characteristics as the number of video sources and the mix effect features. FIGS. 15 to 17 are block diagrams illustrating combinations of parallel structures.

In the example structure 1500 shown in FIG. 15, a background B is paralleled with a parallel quad of foreground video sources $F_1$ to $F_4$ so as to form a parallel 5-layer mix tree, using mix operators 1502 and 1504 which mix their video data inputs according to complementary alphas and mix operators 1506 and 1508 which mix their video data inputs according to composite complementary alphas.

With reference to FIG. 16, a parallel pair provided by the mix operator 1602 is paralleled with a parallel quad provided by the mix operators 1604, 1606, and 1608 so as to form a 6-layer mix tree in the example structure 1600. The output $O_{mix}$ is the final output from the last A/B mix operator 1610.

In the example structure 1700 in FIG. 17, a single background is paralleled to a parallel pair provided by the mix operator 1702 and then further paralleled with a parallel quad so as to form a 7-layer mix tree. The background and parallel pair output are mixed by the mix operator 1703, the parallel quad is provided by the mix operators 1704, 1706, and 1708, and the output $O_{mix}$ is the final output from the last A/B mix operator 1710.

Combinations of various sub-parallel structures may give asymmetric structures, and therefore delay elements could be implemented in shorter branches to provide delay compensation. For example, the branches with the single background source in FIGS. 15 and 17 and the branch between the mix operators 1602 and 1610 in FIG. 16 could include one or more delay elements to compensate for asymmetry in these example structures. A delay element could be implemented, for example, as a mix operator or as a delay device. Considering the background B in FIG. 17, for instance, a further mix operator which receives B at both of its inputs and a unity mix parameter signal could be provided between B and the mix operator 1703, to provide a delay to compensate for the delay associated with the mix operator 1702 in the other input branch to the mix operator 1703.

Pre-Shaper Device

Derivations provided above for various parallel structures use the shaped style of A/B mix operation because of its relatively simple implementation. Therefore each video source could be pre-shaped by multiplying the video source data with its associated alpha data prior to mixing with another video source or video data input. Such a pre-shaping function could be implemented in pre-shaper device.

Generally, a video source could, but need not necessarily, have an explicitly and externally defined associated alpha channel. If a video source does not have a defined alpha channel, then an associated alpha channel of unity values could be assumed. For example, the pure background B herein has an associated alpha with a value of 1.

Figure 18:
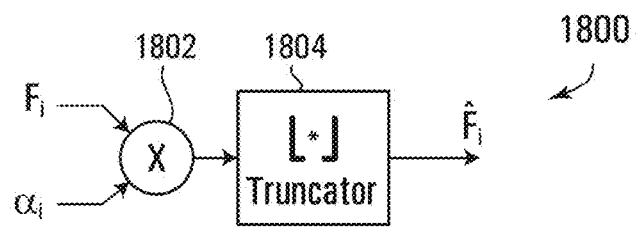
FIG. 18 is a block diagram of an example pre-shaper device.

FIG. 18 is a block diagram of an example pre-shaper device 1800. In this example, the pre-shaper device 1800 implements a multiplication of a video source $F_i$ with its associated alpha in a multiplier 1802. A truncator 1804 is also shown, and in some embodiments truncates fixed-point values while maintaining enough precision to keep error propagation negligible or within an acceptable error range.

Video Mix Device

Figure 19:
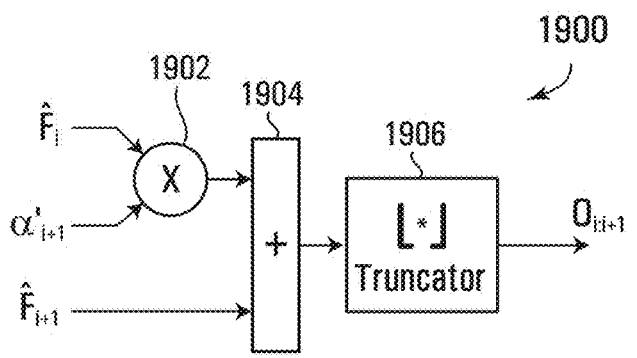
FIG. 19 is a block diagram of an example A/B mix device.

FIG. 19 is a block diagram of an example A/B mix device 1900, implemented by using a wide-bit multiplication in a multiplier 1902, an adder 1904, and optionally a truncator 1906. The truncator 1906, like the truncator 1804 in FIG. 18, is an optional component that in some embodiments truncates fixed-point values while maintaining enough precision to reduce or avoid error propagation.

Alpha Mix Device

Composite complementary alpha in Eq. 2-9 is expressed as a multiplication chain or product of complementary alphas. It could be implemented in binary form by:

1) Fuzzy logic-AND of complementary alphas, or
2) Fuzzy logic-OR of direct-form alphas.

The following paragraphs elaborate on alpha-related calculation devices.

1. Direct-Form Alpha Vs. Complementary Alpha

Figure 20:
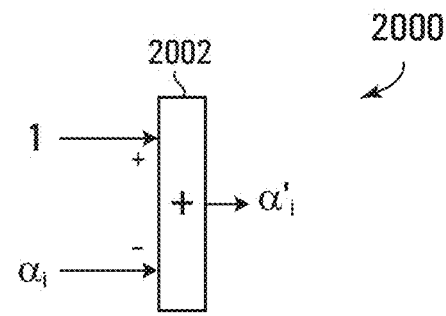
FIG. 20 is a block diagram of an example device to convert direct-form alpha to complementary alpha.

A direct-form alpha is represented by a symbol $\alpha$ while a complementary alpha is represented by a symbol $\alpha'$ in all equations herein. Complementary alpha is mathematically the complement of alpha because $\alpha + \alpha' \equiv 1$. FIG. 20 is a block diagram of an example device 2000 to convert $\alpha$ to $\alpha'$. In video processing devices, $\alpha$ could be represented by a positive decimal value with 1-bit integer plus 10-bit fraction, for example. In this case, the adder 2002 could provide a full-precision converter with two 11-bit inputs.

Other integer/fraction combinations for $\alpha$ are possible. In some implementations, variables might be represented with 10-bit integer parts, and for alpha additional fractional bits could be added. An alpha value with 10-bit additional fractional precision could thus have 20 bits in total, including a 10-bit "integer" part and a 10-bit additional fractional part. In this example, although part of the 20-bit alpha value is referred to as an integer part, the entire 20-bit value could be interpreted as specifying a fractional value between 0 and 1. This could provide for 10-bit precision source alpha values, with additional fractional precision of 10 bits, for example.

2. Fuzzy Logic-AND of Complementary Alphas

Eq. 2-9 expresses a fuzzy logic-AND, equivalent to a bit-by-bit product in the case of binary representations, applied to all complementary alphas from child nodes. FIG. 21 is a block diagram illustrating an example device 2100 to implement a fuzzy logic-AND operation. In FIG. 21, a composite alpha is computed based on fuzzy logic-AND of complementary alphas, using a multiplier 2102 in the example shown. If alphas are expressed in fixed-point, a truncation device shown as the truncator 2104 could be used to maintain certain fractional precision while avoiding overflow in the multiplication chain for composite complementary alphas.

3. Fuzzy Logic-OR of Direct-Form Alphas

Fuzzy logic-AND of two complementary alphas can be expressed in direct-form alphas but with fuzzy logic-OR operation such that $$\alpha'_{i:i+1} = \alpha'_i \cdot \alpha'_{i+1} = (1-\alpha_i)(1-\alpha_{i+1}) = 1-(\alpha_i + \alpha_{i+1} - \alpha_i \alpha_{i+1}) = 1 - \alpha_{i:i+1} \quad \text{Eq. 2-20}$$

where $\alpha_{i:i+1} = \alpha_i + \alpha_{i+1} - \alpha_i \alpha_{i+1}$

FIG. 22A is a block diagram illustrating an example device 2200 to implement a fuzzy logic-OR operation in adders 2202 and 2206 and a multiplier 2204. In FIG. 22A, a composite alpha is computed based on fuzzy logic-OR of direct-form alphas. Although the computation represented in FIG. 22A is not simply a multiplication of complementary alphas, the resultant composite complementary alpha still corresponds to or is equivalent to a product of complementary alphas, as shown by Eq. 2-20.

A truncator 2208 could also be provided in some embodiments, to maintain a certain fractional precision and to avoid multiplication chain overflow.

modules 1406, 1414, 1416 with $\alpha'_{2:3}$, $\alpha'_{4:7}$, $\alpha'_{8:11}$, $\alpha'_{4n-4:4n-1}$ since these mix outputs do not carry on their composite alpha to other A/B mixes, or just apply the rounding to $O_{mix}$ at 1424 while each intermediate mix output sustains L+M bits fraction in truncation.

Example Application—Key Combiner in DVE

Digital video effect (DVE) is a specific application of video layering techniques which follows general A/B mix/effect rules but with unknown background or unknown lower/previous layers. In order to clarify the relationship between a DVE function and a mix tree, Eq. 1-3 is re-written to describe behaviors of a key combiner inside DVE such as:

$$O_{mix} = ((\ \ldots\ ((\ \ldots\ (O_B \alpha'_{n+1} + F_{n+1}\alpha_{n+1})\alpha'_{n+2}\ \ldots\ )\alpha'_{n+k} + F_{n+k}\alpha_{n+k})\alpha'_{n+k+1} + \quad \text{Eq. 3-1}$$
$$F_{n+k+1}\alpha_{n+k+1})\ \ldots\ )\alpha'_N + F_N\alpha_N$$
$$= (\ \ldots\ (((O_B \alpha'_{dve} + O_{dve})\alpha'_{n+k+1} + \hat{F}_{n+k+1})\alpha'_{n+k+2} + \hat{F}_{n+k+2})\ \ldots\ )\alpha'_N + \hat{F}_N$$

Truncation Device

FIGS. 18, 19, 21, and 22A include truncation devices, shown as truncators, which might be useful, for example, under fixed-point calculations. According to the target of L+M bits fraction in truncation for a parallel structure described herein, these truncation devices sustain (L+M) bits fractional part in decimal, to restrict error propagation and to provide seamless switching between layers when all layers are identical. For instance, under a quarter bit maximum error (or M=2) condition, four layers (or N=$2^2$) involves truncation to (2+2)=4 bits fraction in each layer, and 256 layers (or N=$2^8$) involves truncation to (2+8)=10 bits fraction in each layer. There could be an upper limit on the fractional precision that has an effect for error reduction, and therefore the L+M target might apply for L+M up to a certain number of bits, illustratively up to 11 bits.

It should be noted that truncation might not be provided in every embodiment. For example, if calculation devices work with floating-point units, then truncation devices need not be used.

Rounding

Figure 22B:
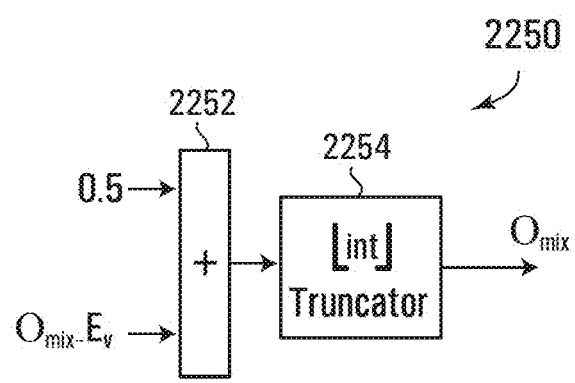
FIG. 22B is a block diagram of an example rounding device.

As noted above, a rounding operation applied to the final mix result $O_{mix}$, expressed in Eq. 2-17, could play a key role in a parallel structure to compensate for truncation errors from each layer. FIG. 22B is a block diagram of an example rounding device 2250 for performing such a rounding operation. The example rounding device 2250 includes an adder 2252 coupled to a truncator 2254.

The final mix output with total truncation error is fed into the adder 2252 of the example rounding device 2250, and 0.5 is added to the final mix output. The output from the adder 2252 is truncated to integer by the truncator 2254.

The final mix result $O_{mix}$ to which rounding is applied is the mix result from a parallel structure, which includes a carry-on alpha which defines boundaries and transparency to the composite video image so as to layer the composite video over other video sources. In a full parallel structure depicted in FIG. 5, the rounding is applied to $O_{mix}$. However, in a partial parallel structure such as in FIG. 13, rounding could be applied to $O_{mix}$ at 1318 when each A/B mix output sustains precision of L+M bits fraction, or to the mix outputs of those mixing modules 1306, 1310, 1314 which use $\alpha'_{2:3}$, $\alpha'_{4:5}$, $\alpha'_{6:7}$, $\alpha_{2n-2:2n-1}$. These mix outputs do not carry on their composite alpha to other A/B mixes, and hence no errors propagate from these NB mixes outputs to others. A similar case of a partial parallel structure, depicted in FIG. 14, may have rounding applied to the outputs of mixing where
$O_B = (\ \ldots\ ((B+F_1\alpha_1)\alpha'_2 + F_2\alpha_2)\alpha'_3 + \ldots\ )\alpha'_n + F_n\alpha_n =$
$((\ \ldots\ (\hat{F}_1\alpha'_2 + \hat{F}_2)\alpha'_3 + \ldots\ )\alpha'_{n-1} + \hat{F}_{n-1})\alpha'_n + \hat{F}_n$
$O_{dve} = (\ \ldots\ ((F_{n-1}\alpha_{n+1})\alpha'_{n+2} + F_{n+2}\alpha_{n+2})\ \ldots\ )\alpha'_{n+k} +$
$F_{n+k}\alpha_{n+k} = (\ \ldots\ (\hat{F}_{n+1}\alpha'_{n+2} + \hat{F}_{n+2})\ \ldots\ + \hat{F}_{n+k-1})\alpha'_{n+k}\hat{F}_{n+k}$
$\alpha'_{dve} = \alpha'_{n+1}\alpha'_{n+2}\ \ldots\ \alpha'_{n+k-1}\alpha'_{n+k}$
k is the number of layers in a DVE branch
n is the number of layers before the DVE branch
N is the number of total layers in a mix tree.

Figure 23:
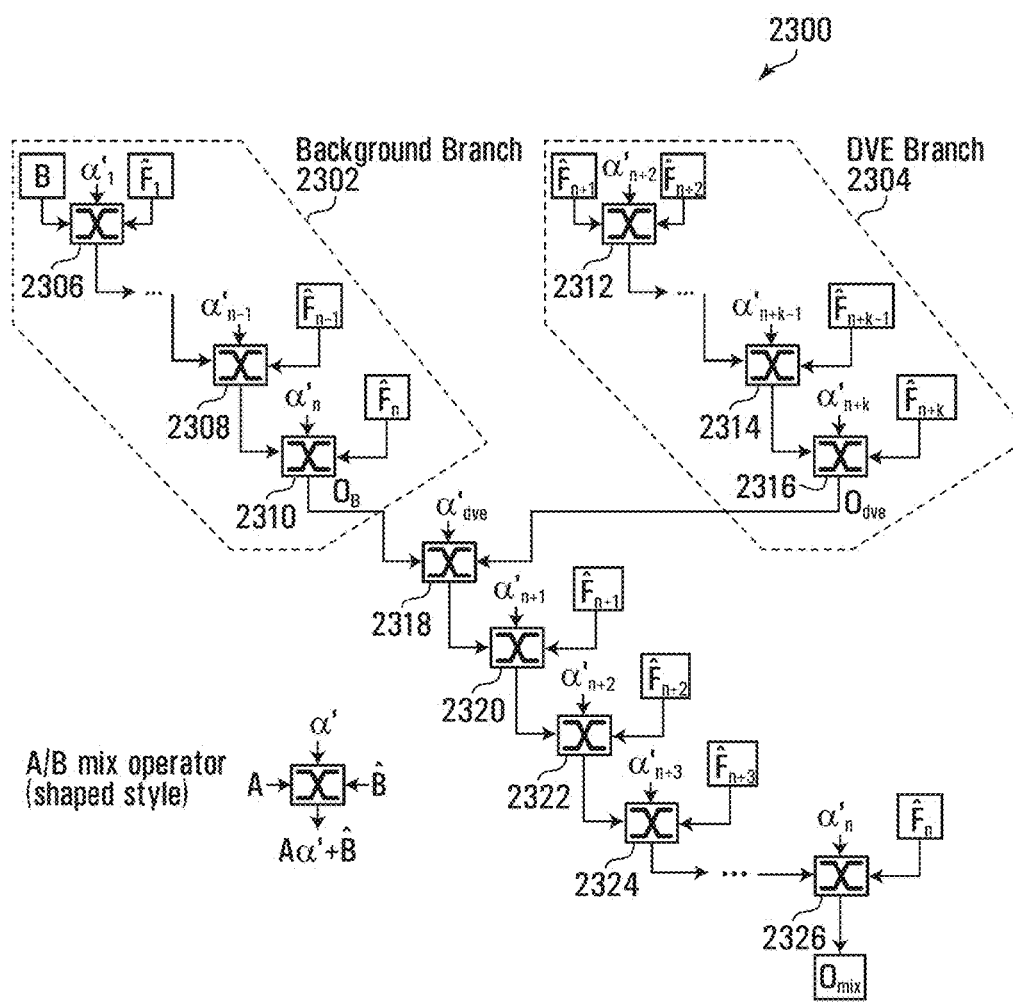
FIG. 23 is a block diagram of an example partial parallel structure.

FIG. 23 is a block diagram of an example partial parallel structure, and illustrates physical behaviors of Eq. 3-1 and the relationship between a key combiner and previous layers. In the example structure 2300, a multi-layered background output $O_B$ from cascade Background branch 2302 is paralleled to a key combiner output $O_{dve}$ from cascade DVE branch 2304 with mix operator 2318. The Background branch 2302 includes cascaded mix operators 2306, 2308, and 2310, and the DVE branch 2304 includes cascaded mix operators 2312, 2314, and 2316. The mix operator 2318 is also cascaded with other mix operators 2320, 2322, 2324, and 2326 in the example shown, and the output $O_{mix}$ is the output from the final cascaded mix operator 2326. The composite complementary alpha applied by the mix operator 2318 allows the Background branch 2302 and DVE branch 2304 processing to be performed in parallel and combined by the mix operator 2318 instead of in a cascade with each other.

Example Application—Layer Swap by Wipe/Dissolve

A swap of two adjacent video layers could use a wipe/dissolve transition to accomplish a seamless switch. Wipe is an effect whereby an upper layer A is partially replaced by a lower layer B in terms of varying geometric areas over time. Dissolve is an effect whereby an upper layer A is partially replaced by a lower layer B in terms of varying video intensity over time. A traditional wipe/dissolve uses two branches of mix trees to blend outputs from them. One mix tree is called a program branch and the other is called a preview branch. Both wipe and dissolve could use an A/B mix operation with unshaped style, for example, to transition program into preview.

Figure 24:
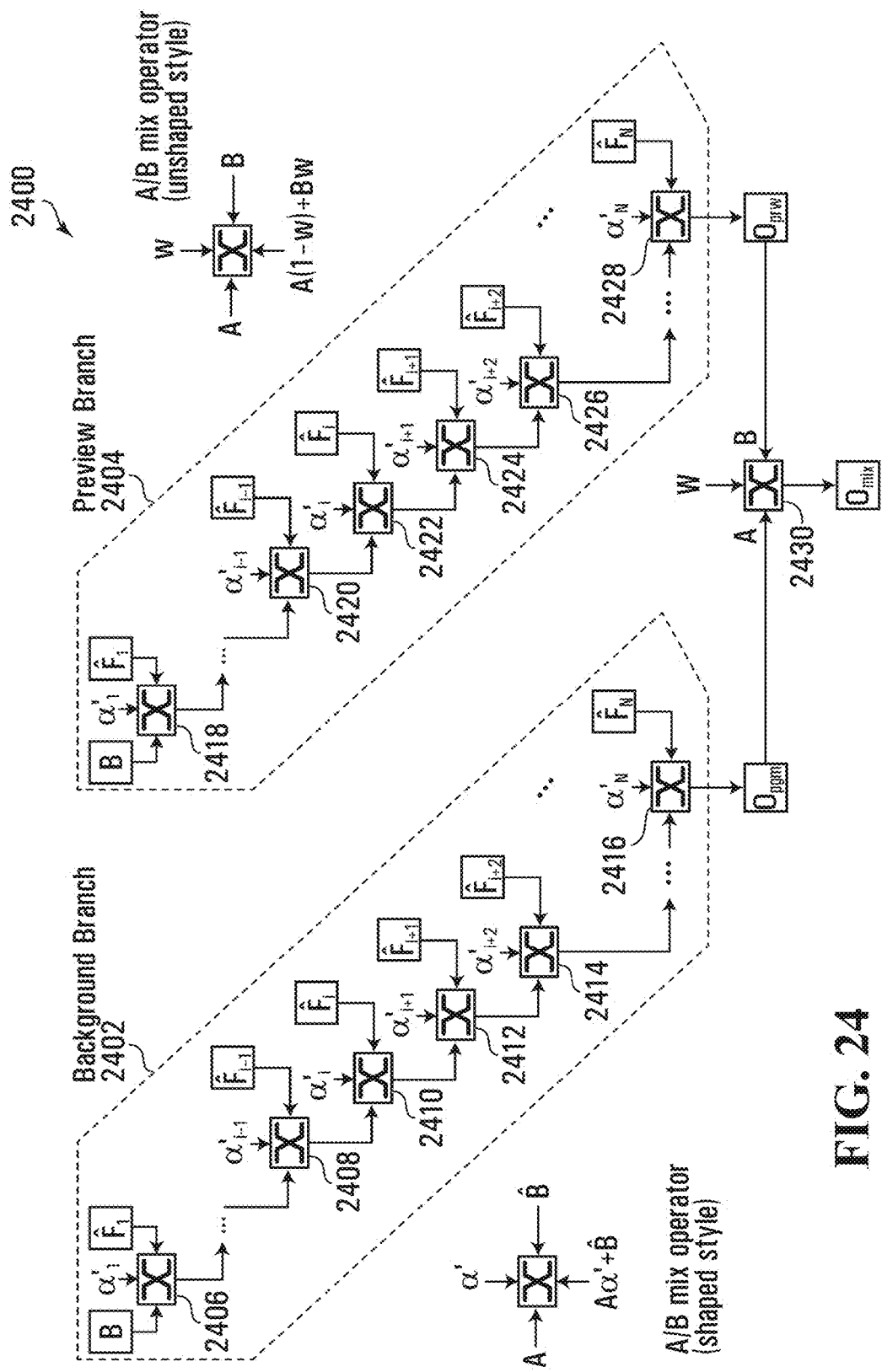
FIG. 24 is a block diagram of an example structure for adjacent layer swap.

FIG. 24 is a block diagram of an example structure 2400 for adjacent layer swap, and illustrates a traditional method to implement wipe and dissolve effects where a layer i and a layer j are to swap. In FIG. 24, wipe and dissolve effects use a Program branch mix tree 2402, with cascaded mix operators 2406, 2408, 2410, 2412, 2414, and 2416, and a Preview branch 2404, with cascaded mix operators 2418,

2420, 2422, 2424, 2426, and 2428 to layer video sources and then use an extra A/B mix operator 2430 to form a final result.

In order to clarify the behaviors of wipe and dissolve mathematically, the program output $O_{pgm}$ in a mix tree branch is expressed by:

$$O_{pgm} = (\ldots (((((B\alpha'_0 \hat{F}_0)\alpha'_1 + \ldots )\alpha'_{i-1} + \hat{F}_{i-1})\alpha'_i + \hat{F}_i)\alpha'_{i+1} + \hat{F}_{i+1})\alpha'_{i+2} + \ldots \hat{F}_{n-1})\alpha'_n + \hat{F}_n \qquad \text{Eq. 3-2}$$

In the preview output $O_{pvw}$ in a mix tree branch, consider an example of a layer source $\hat{F}_j$ replacing $\hat{F}_i$ such that:

$$O_{pvw} = (\ldots (((((B\alpha'_0 + \hat{f}_0)\alpha'_1 + \ldots )\alpha'_{i-1} + \hat{F}_{i-1})\alpha'_{i+1} + \hat{F}_{i+1})\alpha'_i + \hat{F}_i)\alpha'_{i+2} + \ldots \hat{F}_{n-1})\alpha'_n + \hat{F}_n \qquad \text{Eq. 3-3}$$

A wipe pattern $w_i$ is applied to $O_{pgm}$ and $O_{pvw}$ in order to mix $F_i$ and $F_{i+1}$ such that $$O_{mix} = O_{pgm}(1 - w_i) + O_{pvw} w_i = O_{pgm} w'_i + O_{pvw} w_i \qquad \text{Eq. 3-4}$$

where $$O_{pvw} w_i = (( \ldots ((((B\alpha'_1 + \hat{F}_1)\alpha'_2 + \cdots \hat{F}_{i-1})\alpha'_i + \hat{F}_i)\alpha'_{i+1} + \hat{F}_{i+1})\alpha'_{+2i} \ldots )\alpha'_n + \hat{F}_n) w_i$$

$$= ( \ldots ((((B\alpha'_1 + \hat{F}_1)\alpha'_2 + \cdots \hat{F}_{i-1})\alpha'_i \alpha'_{i+1} w_i + \hat{F}_i \alpha'_{i+1} w_i + \hat{F}_{i+1} w_i)\alpha'_{i+2} + \hat{F}_{i+2} w_i) \ldots$$

$$\hat{F}_{n-1} w_i)\alpha'_n + \hat{F}_n w_i$$

$$O_{pvm} w'_i = (( \ldots ((((B\alpha'_1 + \hat{F}_1)\alpha'_2 + \cdots \hat{F}_{i-1})\alpha'_{i+1} + \hat{F}_{i+1})\alpha'_i + \hat{F}_i)\alpha'_{i+2} \ldots )\alpha'_n + \hat{F}_n) w'_i$$

$$= ( \ldots ((((B\alpha'_1 + \hat{F}_1)\alpha'_2 + \cdots \hat{F}_{i-1})\alpha'_i \alpha'_{i+1} w'_i + \hat{F}_{i+2} \alpha'_i w'_i + \hat{F}_i w'_i)\alpha'_{i+2} + \hat{F}_{i+2} w_i) \ldots$$

$$\hat{F}_{n-1} w_i)\alpha'_n + \hat{F}_n w_i$$

Eq. 3-4 can be further re-organized such that:

$$O_{mix} = ( \ldots (((B + \hat{F}_0)\alpha'_1 + \cdots )\alpha'_{i:i+1} + O_{i:i+1})\alpha'_{i+2} + \cdots \hat{F}_{n-1})\alpha'_n + \hat{F}_n \qquad \text{Eq. 3-5}$$

where $$\begin{cases} O_{i:i+1} = (\hat{F}_{i+1}\alpha'_i + \hat{F}_i) w'_i + (\hat{F}_i \alpha'_{i+1} + \hat{F}_{i+1}) w_i \\ \alpha'_{i:i+1} = \alpha'_i \alpha'_{i+1} \end{cases}$$

Figure 25:
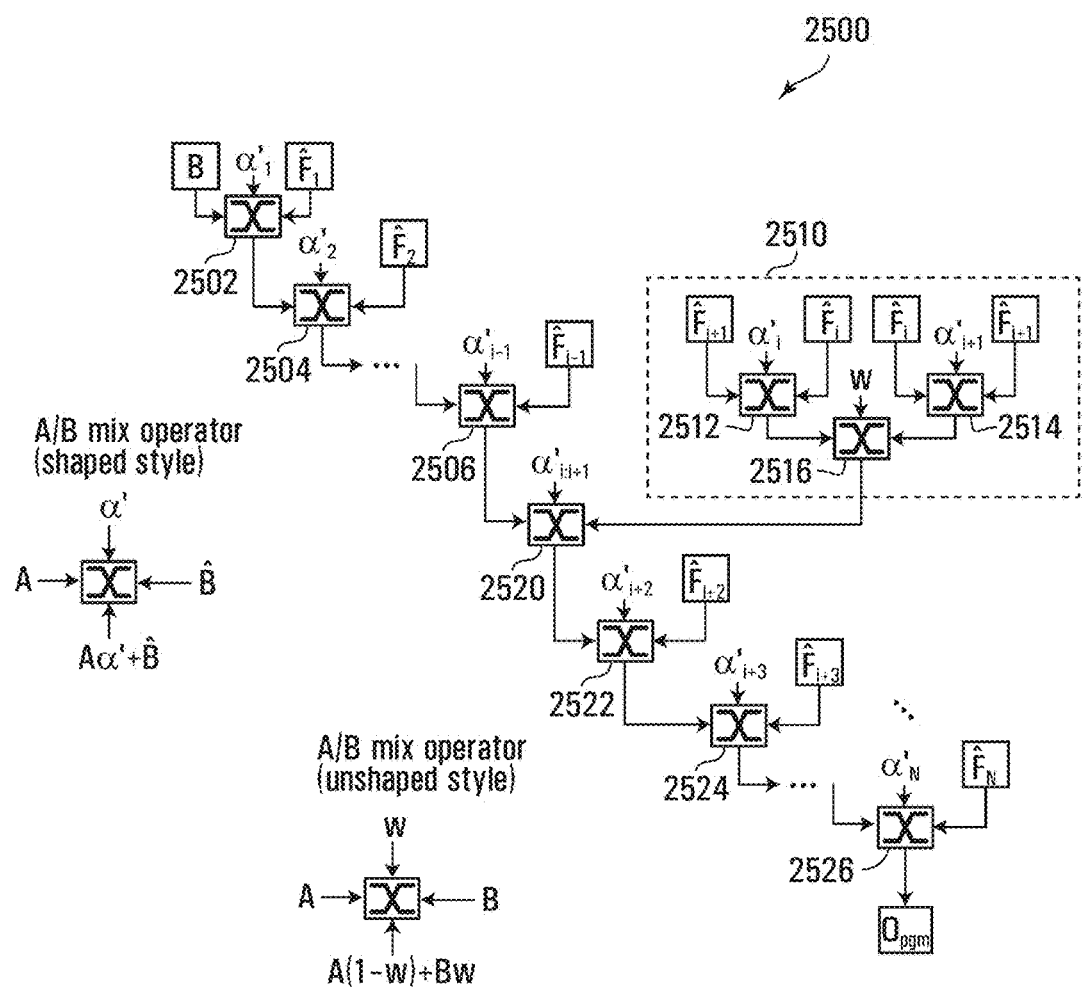
FIG. 25 is a block diagram illustrating an example partial parallel structure for adjacent layer swap.

FIG. 25 is a block diagram illustrating an example partial parallel structure 2500 for adjacent layer swap. This is an example implementation of Eq. 3-5 where two adjacent video sources $F_i$ and $F_{i+1}$ are paired to form a parallel quad structure 2510, except that the lower level mix operator 2516 uses an unshaped style of A/B mix with alpha equal to w. The example structure 2500 is partially parallel in that it includes the parallel quad 2510 implemented by mix operators 2512, 2514, and 2516, and a series of cascaded mix operators 2502, 2504, 2506, 2520, 2522, 2524, and 2526. The mix operator 2520 mixes its video data inputs according to a composite complementary alpha in the example shown.

Eq. 3-5 exposes the following properties:

1. any layer lower than $F_i$ or higher than $F_{i+1}$ is independent of wipe $w_i$—in other words, a wipe on two neighboring layers only affects those layers;

2. a wipe on two layers can be treated as cross-blending on two pair-layer mixes through a wipe pattern,
   1) pair-layer mix $(\hat{F}_{i+1}\alpha'_i + \hat{F}_i)$ and,
   2) pair-layer mix $(\hat{F}_i \alpha'_{i+1} + \hat{F}_{i+1})$.

3. manipulation of wipe pattern $w_1$, shown as w at mix operator 2516 in FIG. 25, gives conventional keying effects such that:

$$O_{i:i+1} = \begin{cases} \hat{F}_{i+1}\alpha'_i + \hat{F}_i = (F_{i+1}\alpha_{i+1})\alpha'_i + F_i \alpha_i & \text{if } w_i = 0 \\ \hat{F}_i \alpha'_{i+1} + \hat{F}_{i+1} = (F_i \alpha_i)\alpha'_{i+1} + F_{i+1}\alpha_{i+1} & \text{if } w_i = 1 \end{cases} \qquad \text{Eq. 3-6}$$

4. if two keys are identical $F_i = V$, then the wipe output is $$O_{i:i+1} = V(\alpha_i + \alpha_{i+1} - \alpha_i \alpha_{i+1}) = V \alpha_{i:i+1}$$

This property illustrates how a parallel structure performs a seamless keying effect.

Example Application—Layer-Mode MLEs

The traditional concept of an MLE only deals with output of multi-layered videos as an independent video without associated alpha. In other words, if an MLE output is layered on the top of others, this MLE blocks all others' visibilities.

A layer mode of MLE carries on all video-layer-associated alphas through a mix tree and constructs a composite alpha as an MLE-associated alpha. This MLE-associated alpha is used to layer its MLE on the top of other MLEs or lower video layers. Because of those carried-on alphas, a layer mode MLE forms a parallel structure. Mathematical expressions are explained as follows. Assume that there are:

1) m MLEs in total layers
2) n layers in each MLE
3) m×n layers in total.

Based on these assumptions, Eq. 1-3 can be written as:

$$O_{mix} = \qquad \text{Eq. 3-7}$$

$$((((((\ldots ((((\ldots ((B\alpha'_1 + \hat{F}_1)\alpha'_2 + \hat{F}_2) \ldots )\alpha'_{n-1} + \hat{F}_{n-1})\alpha'_n +$$

$$\hat{F}_n)\alpha'_{n+1} + \hat{F}_{n+1}) \ldots )\alpha'_{2n-1} + \hat{F}_{2n-1})$$

$$\alpha'_{2n} + \hat{F}_{2n})\alpha'_{2n+1} + \cdots \hat{F}_{(m-1)n-1})$$

$$\alpha'_{(m-1)n-1} + \hat{F}_{(m-1)n-1})\alpha'_{(m-1)n} + \hat{F}_{(m-1)n})$$

$$\alpha'_{(m-1)n+1} + \cdots \hat{F}_{mn-2})\alpha'_{mn-1} + \hat{F}_{mn-1}$$

After re-organizing Eq. 3-7, a cascade structure for multiple MLEs is expressed as:

$$O_{mix} = (((O_{mle1}\alpha'_{mle2} + O_{mle2})\alpha'_{mle3} + O_{mle3}) \ldots )\alpha'_{mlen} + O_{mlen} \quad \text{Eq. 3-8}$$

where $$O_{mle1} = ( \ldots ((B\alpha'_1 + \hat{F}_1)\alpha'_2 + \hat{F}_2) \ldots )\alpha'_{n-1} + \hat{F}_{n-1}$$

$$O_{mle2} = ( \ldots (\hat{F}_n\alpha'_{n+1} + \hat{F}_{n+1}) \ldots \hat{F}_{2n-1})\alpha'_{2n-1} + \hat{F}_{2n-1}$$

$$\alpha'_{mle2} = \prod_{i=n}^{2n-1} \alpha'_i$$

$$\ldots \ldots \ldots \ldots$$

$$O_{mlek} =$$

$$( \ldots (\hat{F}_{(k-1)n}\alpha'_{(k-1)n+1} + \hat{F}_{(k-1)n+1}) \ldots \hat{F}_{kn-2})\alpha'_{kn-1} + \hat{F}_{kn-1},$$

$$\alpha'_{mlek} = \prod_{i=(k-1)n}^{kn-1} \alpha'_i, \quad k = 1, \ldots, m$$

Figure 26:
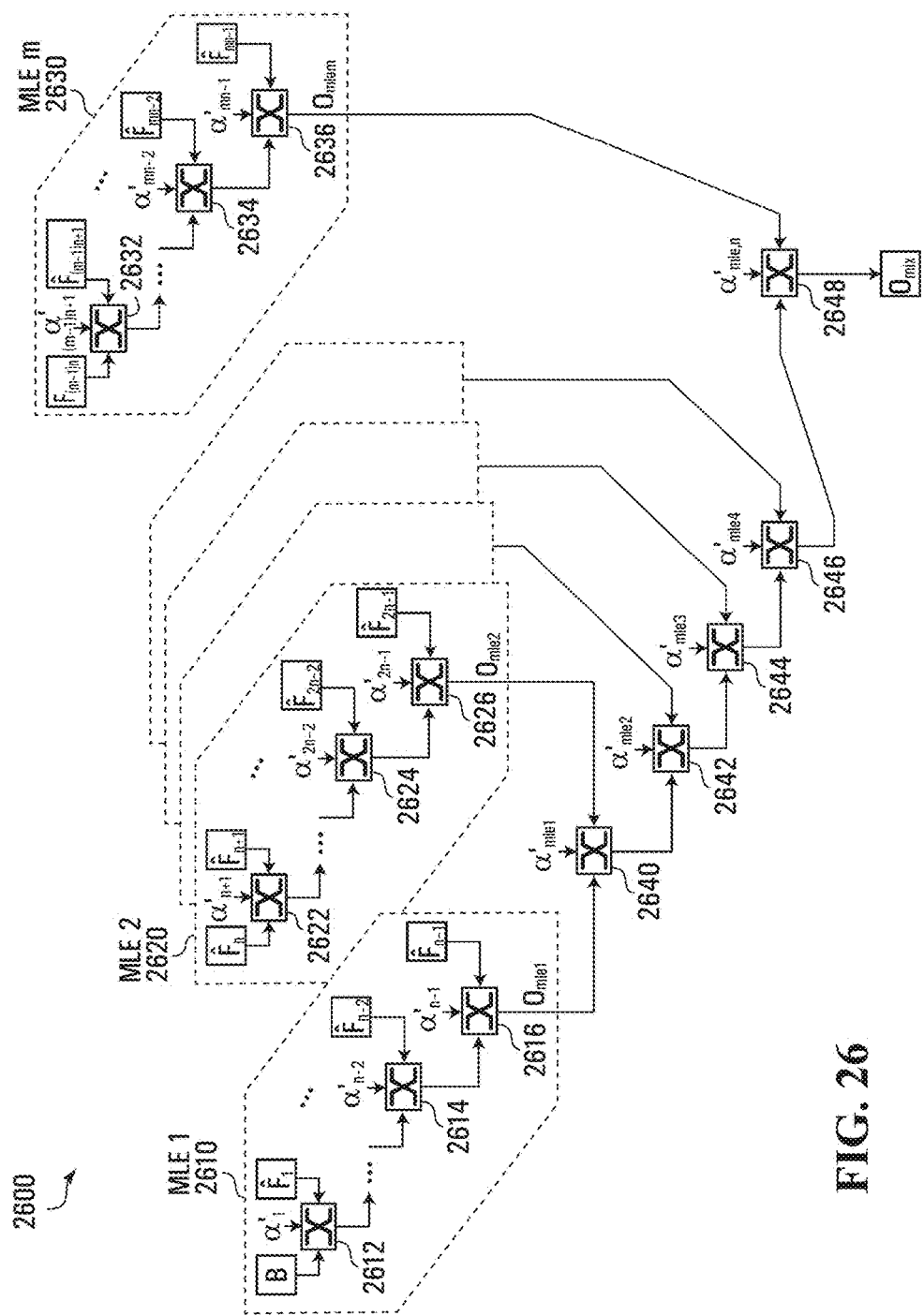
FIG. 26 is a block diagram illustrating an example structure of cascaded parallel Multiple Level Effects (MLEs).

FIG. 26 is a block diagram of an example structure 2600 of cascaded parallel MLEs. The example structure 2600 includes multiple MLE branches 2610, 2620, . . . , 2630, each with cascaded mix operators 2612, 2614, and 2616; 2622, 2624, and 2626; 2632, 2634, and 2636. The MLE branch outputs are combined with other branch or mix operator outputs in the cascaded mix operators 2640, 2642, 2644, 2646, and 2648, which apply respective composite complementary alphas to their inputs.

Example Application—Parallel MLEs

The parallel structures described herein are applicable to various types of video sources or video data input, including multiple MLEs. For example, one or more video sources could be replaced by an MLE output with an MLE-associated composite alpha in a full parallel structure such as shown in FIGS. 5 and 6. Replacing all video sources with MLE outputs would provide full parallel MLEs. One or more video sources could similarly be replaced with MLE outputs having MLE-associated composite alphas in the partial parallel structures shown in FIGS. 13 to 17 and 23 to 26.

Implementation

Embodiments are described herein primarily in terms of A/B mix operators or more generally video data mixing modules. Such modules, and/or other components, could make use of multi-core processing devices such as one or more General Purpose Graphic Processing Units (GPGPUs) and/or one or more Field Programmable Gate Arrays (FPGAs). Although parallel structures can introduce accuracy concerns if truncation occurs in parallel branches, advanced techniques in GPGPUs and FPGAs can provide an array of floating point Arithmetic Logic Units (ALUs) or wide-bit Digital Signal Processing (DSP) units and hence provide high calculation precisions to implement parallel structures.

Figure 27:
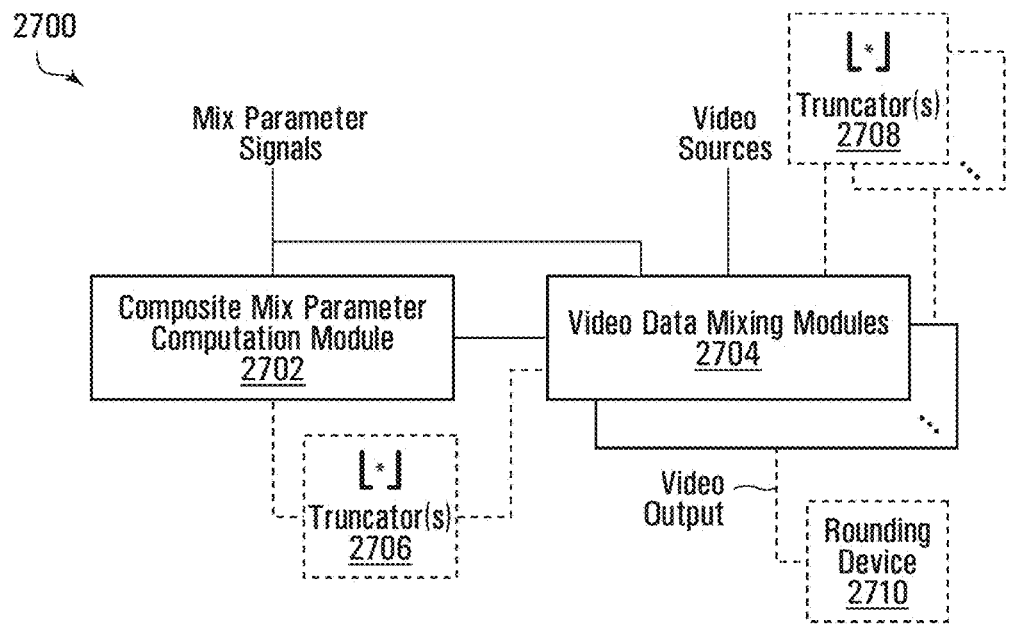
FIG. 27 is a block diagram of an apparatus according to an embodiment.

FIG. 27 is a block diagram of an apparatus according to an embodiment. The example apparatus 2700 includes a composite mix parameter computation module 2702 and video data mixing modules 2704, coupled together as shown. In some embodiments, one or more truncators 2706 could be coupled to the composite mix parameter computation module 2702, and one or more truncators 2708 could also be coupled to one or more of the video data mixing modules 2704. A rounding device 2710 could also be provided and coupled to receive the final video output as shown, or coupled to one or more of the video data mixing modules 2704. Respective rounding devices could be coupled to receive the mix outputs of multiple video data mixing modules 2704.

In general, hardware, firmware, components which execute software, or some combination thereof might be used in implementing the composite mix parameter computation module 2702, the video data mixing modules 2704, the truncator(s) 2706, the truncator(s) 2708, and/or the rounding device 2710. Electronic devices that might be suitable for implementing any or all of these components include, among others, microprocessors, microcontrollers, Programmable Logic Devices (PLDs), GPGPUs and/or FPGAs as noted above, Application Specific Integrated Circuits (ASICs), and other types of "intelligent" integrated circuits. For instance, implementation options could include one or more of parallel multi-cores in a GPGPU, parallel multi-kernels in an FPGA, multiple processing cores in a Central Processing Unit (CPU), and/or multiple processing cores in an ASIC.

As described herein, the video data mixing modules 2704 include one or more modules to mix video data inputs according to respective composite mix parameter signals. Not every video data mixing module 2704 would use a composite mix parameter signal, but at least one video data mixing module uses a composite mix parameter signal. In FIG. 26, for example, the cascaded mix operators 2640, 2642, 2644, 2646, and 2648 all apply composite complementary alphas, whereas the mix operators in each MLE branch 2610, 2620, . . . , 2630 apply complementary alphas. The video data mixing modules could be or include A/B mix operators, for example.

The composite mix parameter signal computation module 2702 represents a possible implementation of a module to compute the composite mix parameter signals for the video data mixing modules 2704 that use them. Each composite mix parameter signal corresponds to a product of mix parameter signals that are based on mix parameter signals respectively associated with multiple video data inputs, as described herein. The composite mix parameter signal computation module 2702 could include, for example, adders to compute the complements of alpha signals in the manner shown in FIG. 20. The composite mix parameters could then be computed with multipliers as shown in FIG. 21 or with adders and a multiplier as shown in FIG. 22A, for example.

Examples of truncator(s) 2706 used in computation of mix parameter signals are shown in FIGS. 21 and 22A, and examples of truncator(s) used in mixing video input signals are shown in FIGS. 18 and 19. FIG. 22B shows an example of a rounding device 2710.

Although the composite mix parameter signal computation module 2702 and the video data mixing modules 2704 are shown separately in FIG. 27, they need not necessarily be implemented in different physical components. For example, a single GPGPU, FPGA, or ASIC could implement both the composite mix parameter signal computation module 2702 and the video data mixing modules 2704. Any or all of the truncator(s) 2706, the truncator(s) 2708, and the rounding device 2710 could similarly be integrated with other elements instead of in separate physical components.

Separate inputs for the mix parameter signals and video sources are also shown in FIG. 27, but need not necessarily be provided in every embodiment. As described herein, alpha channels could be defined for each video source, and in that case the alpha channels could be provided to the composite mix parameter signal computation module 2702 for computation of composite mix parameter signals. Alphas could instead be extracted or otherwise derived from video sources. The composite mix parameter signal computation module 2702, or possibly another component that derives alphas or other mix parameter signals from the video sources, could receive the video sources and provide the mix parameter signals to the composite mix parameter signal computation module 2702 and the video data mixing modules 2704.

Also, although FIG. 27 shows video sources incoming to the video data mixing modules 2704, as noted above any or all video sources could be replaced with MLE outputs.

The video data mixing modules 2704 could include video data mixing modules to mix respective pairs of video data inputs in parallel, according to a mix parameter signal associated with one of the video data inputs of each pair, and to provide respective parallel mixed video data outputs. There could also be one or more video data mixing modules, for each of multiple video effects levels for example, to further mix parallel mixed video data outputs with other video data inputs in accordance with respective composite mix parameter signals. In an embodiment, a composite mix parameter signal corresponds to a product of mix parameter signals that are based on mix parameter signals respectively associated with multiple video data inputs.

The video data mixing modules at each level above a first level could be coupled to receive and further mix respective pairs of the parallel mixed video data outputs in some embodiments.

The mix parameter signals respectively associated with multiple video data inputs could be alpha signals. The composite mix parameter signal could then correspond to a product of complementary alpha signals that are complements of the alpha signals.

For a binary tree implementation, the video data mixing modules 2704 include a respective video data mixing module for each node in a binary tree, to mix two video data input signals that include respective video data output signals from two child nodes in the binary tree. With reference to FIG. 5, for instance, the output signals shown at each node could be calculated by respective video data mixing modules using the complementary alphas and composite complementary alphas shown in FIG. 6.

A video data mixing module 2704 for a node in a binary tree calculates a video data output signal for its node by adding the video data output signal from one of the two child nodes in the binary tree to a weighted video data output signal from the other one of the two child nodes. The weighted video data output signal is weighted in some embodiments by a complement of an alpha signal associated with the one of the two child nodes.

Video data mixing modules that mix video data inputs at respective nodes in a binary tree above the lowest video source signal level perform mix operations according to respective composite mix parameter signals. The composite mix parameter signal for each video data mixing module for a node in the binary tree corresponds to a product of a complementary alpha signal from one of the two child nodes of the node and a complementary alpha signal from the other one of the two child nodes.

There could be additional components in some embodiments.

Pre-shaper devices could be coupled to the video data mixing modules 2704 to receive respective video source signals and associated alpha signals, and to provide products of the respective video source signals and associated alpha signals as video data input signals.

Truncation modules such as truncators could also or instead be respectively coupled to the composite mix parameter computation module 2702 and any of the video data mixing modules 2704, to truncate composite mix parameter signals and video data output signals from the video data mixing modules based on an error. In one embodiment, a first truncation module such as a truncator 2706 is coupled to a video data mixing module 2704 that is to further mix a parallel mixed video data output with a further video data input in accordance with a composite mix parameter signal. The first truncation module is configured or otherwise operable to truncate the composite mix parameter signal from the composite mix parameter computation module 2702 based on an error, and to provide a truncated composite mix parameter signal to the video data mixing module that is to further mix the parallel mixed video data output with a further video data input. Mixing by the video data mixing module is then based on the truncated composite mix parameter signal.

A second truncation module such as a truncator 2708 could be coupled to a video data mixing module 2704 that is to further mix the parallel mixed video data output with a further video data input, to truncate a further video data output signal from that video data mixing module based on the error.

For example, the video data mixing modules 2704 could mix video data inputs in parallel at one or more levels of a multi-level mix tree. The video data mixing modules 2704 include one or more video data mixing modules at each of the one or more levels to further mix parallel mixed video data outputs at the one or more levels with other video data inputs according to a respective composite mix parameter signal for each of the one or more video data mixing modules. A respective first truncation module such as a truncator 2706 could be coupled to each of the one or more video data mixing modules, to truncate the respective composite mix parameter signal for each of the one or more video data mixing modules based on a number of levels in the multi-level mix tree and an error tolerance and to provide a respective truncated composite mix parameter signal to each of the one or more video data mixing modules. A respective second truncation module such as a truncator 2708 could be respectively coupled to each of the one or more video data mixing modules 2704 that is to perform further mixing, to truncate video data output signals from each of the one or more video data mixing modules to a fractional precision based on the number of levels in the multi-level mix tree and the error tolerance. Quarter-bit error tolerances and an (L+M) fractional precision criterion are noted above, although other error tolerances and precisions are possible.

Thus, truncation could be applied to both composite mix parameter signals and to mix outputs.

Rounding could also be applied, to a final mix output or to one or more intermediate parallel mixed video data outputs. For example, a rounding module such as a rounding device 2250 (FIG. 22B) could be coupled to a top level video data mixing module at a top level of the mix tree, to round a video data output signal from the top level video data mixing module to an integer value. Where the top level video data mixing module is one of the mixing modules that further mixes parallel mixed video data outputs with other video data inputs according to a composite mix parameter signal, then a truncation module coupled to the top level mixing module could be part of a rounding module to round the video data output signal from the top level video data mixing module to an integer value. Similarly, to apply rounding to an intermediate mix result from a mixing module that further mixes parallel mixed video data outputs with other video data inputs, the truncation module coupled to that mixing module could be part of a rounding module to round the video data output signal from the mixing module to an integer value. As shown in FIG. 22B, for example, a rounding device 2250 which could be implemented as a rounding module could include a truncation module such as a truncator 2254.

Other variations are also possible.

Figure 28:
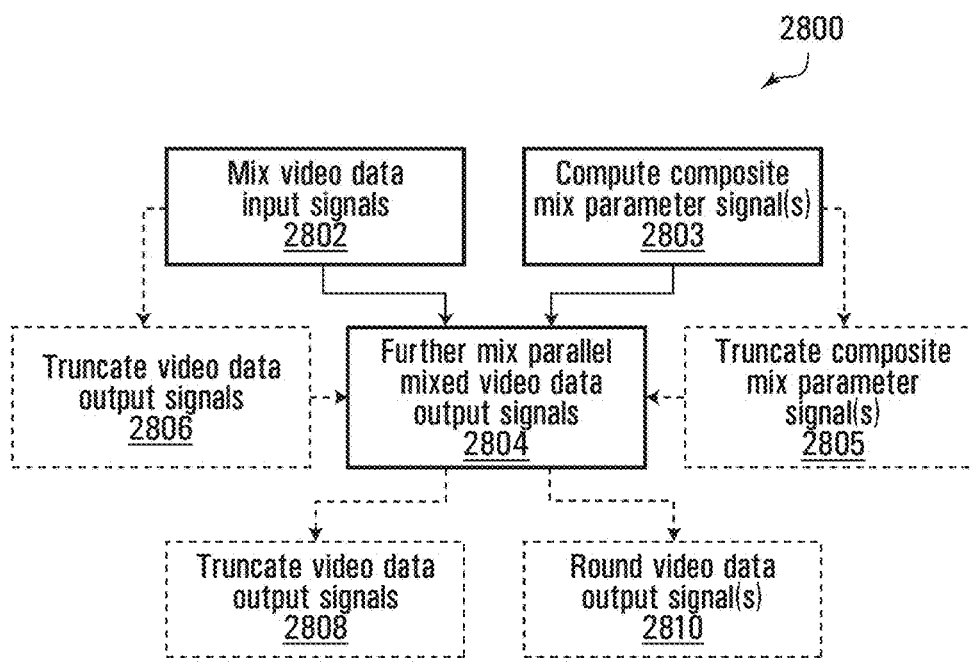
FIG. 28 is a flow diagram illustrating an example method.

Embodiments are described above primarily in terms of tree structures and apparatus. Methods are also contemplated. FIG. 28 is a flow diagram illustrating an example method.

The example method 2800 relates to mixing video data inputs, and involves mixing video data inputs in parallel at 2802, according to mix parameter signals associated with one of the video data inputs, to provide a parallel mixed video data output. The parallel mixed video data output is further mixed with a further video input at 2804 according to a composite mix parameter signal. The composite mix parameter signal corresponds to a product of mix parameter signals that are based on mix parameter signals respectively associated with multiple video data inputs, and computation of the composite mix parameter signal is shown at 2803.

Optionally, the composite mix parameter signal and the video data outputs from 2802 and 2804 could be truncated at 2805, 2806, and 2808, based on an error or an error tolerance. Truncation at 2805, 2806, and 2808 could also be based on the number of levels in a multi-level mixing structure or operation.

In some embodiments, rounding to integer is applied at 2810 to a mix output, which could be a final mix output or, in the case of a partial parallel structure, to an intermediate mix output from mixing that involves a composite mix parameter signal. In a multi-level mix tree, for example, rounding could be applied to a mix output from the top level of the mix tree or to mix outputs from further mixing of parallel mixed video data output signals at one or more lower levels in the tree.

The method 2800 shown in FIG. 28 is solely for illustrative purposes. The operations shown in FIG. 28 could be performed in any of various ways, and there could be additional operations which are not shown.

For instance, there could be multiple mixing operations at 2802 and/or multiple further mixing operations at 2804 involving multiple composite mix parameter signals. These and other variations could be apparent from the apparatus drawings and descriptions herein, for example.

CONCLUSION

What has been described is merely illustrative of the application of principles of embodiments of the present disclosure. Other arrangements and methods can be implemented by those skilled in the art.

For example, the divisions of functions represented in the drawings which show binary trees, parallel structures, and apparatus are solely for illustrative purposes. Other embodiments could include fewer, more, and/or different components than explicitly shown, interconnected in a similar or different order. Methods could similarly include fewer, more, and/or different operations performed in a similar or different manner than explicitly shown in FIG. 28.

In addition, although described primarily in the context of apparatus and methods, other implementations are also contemplated, as instructions stored on a non-transitory computer-readable medium, for example.

I claim:

1. An apparatus comprising a plurality of video data mixing modules implemented using one or more electronic devices to mix video data inputs, the plurality of video data mixing modules including:
   video data mixing modules to mix respective pairs of video data inputs in parallel according to a mix parameter signal associated with one of the video data inputs of each pair and to provide respective parallel mixed video data outputs;
   a further video data mixing module, coupled to the video data mixing modules, to further mix the parallel mixed video data outputs according to a composite mix parameter signal, the composite mix parameter signal corresponding to a product of mix parameter signals that are based on mix parameter signals respectively associated with the video data inputs of one of the pairs of video data inputs.

2. The apparatus of claim 1, further comprising:
   a composite mix parameter signal computation module, implemented using an electronic device, to compute the composite mix parameter signal, the composite mix parameter signal computation module being coupled to the further video data mixing module.

3. The apparatus of claim 1, the plurality of video data mixing modules comprising:
   a plurality of video data mixing modules including the video data mixing modules, to mix respective pairs of video data inputs in parallel and to provide respective parallel mixed video data outputs;
   a plurality of further video data mixing modules including the further video data mixing module, for each of a plurality of video effects levels, to further mix video data inputs in accordance with respective composite mix parameter signals, the further video data mixing modules at levels above a first level of the video effects levels being coupled to receive and further mix respective pairs of the parallel mixed video data outputs.

4. The apparatus of claim 1, the mix parameter signals respectively associated with the video data inputs of one of the pairs of video data inputs comprising alpha signals, the composite mix parameter signal corresponding to a product of complementary alpha signals that are complements of the alpha signals.

5. The apparatus of claim 4, further comprising:
   a composite mix parameter signal computation module, implemented using an electronic device, to compute the composite mix parameter signal, the composite mix parameter signal computation module being coupled to the further video data mixing module,
   the composite mix parameter signal computation module comprising a plurality of adders to compute the complements of the alpha signals.

6. The apparatus of claim 4, further comprising:
   a composite mix parameter signal computation module, implemented using an electronic device, to compute the composite mix parameter signal, the composite mix parameter signal computation module being coupled to the further video data mixing module,
   the composite mix parameter signal computation module comprising a plurality of multipliers to compute products of the complementary alpha signals.

7. The apparatus of claim 4, further comprising:
   a composite mix parameter signal computation module, implemented using an electronic device, to compute the composite mix parameter signal, the composite mix parameter signal computation module being coupled to the further video data mixing module, the composite mix parameter signal corresponding to a product of two of the complementary alpha signals that are respective complements of two of the alpha signals, the composite mix parameter signal computation module comprising:
a first adder to compute a sum of the two of the alpha signals;
a multiplier to compute a product of the two alpha signals;
a second adder to compute the composite mix parameter signal by subtracting the product from the sum.

8. The apparatus of claim 1, the video data mixing modules and the further video data mixing module comprising a respective video data mixing module for each node in a binary tree, to mix two video data input signals that comprise respective video data output signals from two child nodes in the binary tree.

9. The apparatus of claim 8, each respective video data mixing module calculating a video data output signal for its node in the binary tree by adding the video data output signal from one of the two child nodes in the binary tree to a weighted video data output signal from the other one of the two child nodes.

10. The apparatus of claim 9, the weighted video data output signal being weighted by a complement of an alpha signal associated with the one of the two child nodes.

11. The apparatus of claim 8, the video data mixing modules and the further video data mixing module comprising a plurality of video data mixing modules to mix video data inputs at respective nodes in the binary tree according to respective composite mix parameter signals, the respective composite mix parameter signal for each video data mixing module for a node in the binary tree corresponding to a product of a complementary alpha signal from one of the two child nodes of the node and a complementary alpha signal from the other one of the two child nodes.

12. The apparatus of claim 1,
the mix parameter signals respectively associated with the video data inputs of one of the pairs of video data inputs comprising alpha signals, the apparatus further comprising:
a plurality of pre-shaper devices, implemented using one or more electronic devices, coupled to the video data mixing modules and to the further video data mixing module, the pre-shaper devices to receive respective video source signals and associated alpha signals, and to provide products of the respective video source signals and associated alpha signals as video data input signals.

13. The apparatus of claim 1, each of the video data mixing modules comprising an A/B mix effect device.

14. The apparatus of claim 1, further comprising:
a first truncation module, implemented using an electronic device and coupled to the further video data mixing module, to truncate the composite mix parameter signal based on an error and to provide a truncated composite mix parameter signal to the further video data mixing module;
a second truncation module, implemented using an electronic device and coupled to the further video data mixing module, to truncate, based on the error, a further video data output signal from the further video data mixing module.

15. A method of mixing video data inputs, the method comprising:
mixing respective pairs of video data inputs in parallel according to a mix parameter signal associated with one of the video data inputs of each pair, to provide respective parallel mixed video data outputs;
further mixing the parallel mixed video data outputs according to a composite mix parameter signal, the composite mix parameter signal corresponding to a product of mix parameter signals that are based on mix parameter signals respectively associated with the video data inputs of one of the pairs of video data inputs.

16. The method of claim 15,
the further mixing comprising further mixing respective pairs of the parallel mixed video data outputs modules in accordance with respective composite mix parameter signals.

17. The method of claim 15, the mix parameter signals respectively associated with the video data inputs of one of the pairs of video data inputs comprising alpha signals, the composite mix parameter signal corresponding to a product of complementary alpha signals that are complements of the alpha signals.

18. The method of claim 15, the mixing and the further mixing comprising respective mix operations for each node in a binary tree, to mix two video data input signals that comprise respective video data output signals from two child nodes in the binary tree.

19. The method of claim 18, each respective mix operation comprising calculating a video data output signal for its node in the binary tree by adding the video data output signal from one of the two child nodes in the binary tree to a weighted video data output signal from the other one of the two child nodes.

20. The method of claim 15, further comprising:
truncating the composite mix parameter signal based on an error to generate a truncated composite mix parameter signal, the further mixing comprising further mixing the parallel mixed video data outputs according to the truncated composite mix parameter signal;
truncating, based on the error, a further video data output signal from the further mixing.

* * * * *